US011171999B2

(12) United States Patent
Leung et al.

(10) Patent No.: US 11,171,999 B2
(45) Date of Patent: Nov. 9, 2021

(54) METHODS AND APPARATUS FOR USE OF COMPACT CONCURRENT CODECS IN MULTIMEDIA COMMUNICATIONS

(71) Applicant: QUALCOMM Incorporated, San Diego, CA (US)

(72) Inventors: Nikolai Konrad Leung, San Francisco, CA (US); Yekui Wang, San Diego, CA (US); Ramachandran Subramanian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 162 days.

(21) Appl. No.: 15/652,946

(22) Filed: Jul. 18, 2017

(65) Prior Publication Data

US 2018/0027027 A1    Jan. 25, 2018

Related U.S. Application Data

(60) Provisional application No. 62/365,348, filed on Jul. 21, 2016, provisional application No. 62/381,559, filed on Aug. 30, 2016.

(51) Int. Cl.
*H04L 29/08* (2006.01)
*H04L 29/06* (2006.01)
(Continued)

(52) U.S. Cl.
CPC .... *H04L 65/1069* (2013.01); *H04L 29/06414* (2013.01); *H04L 65/1003* (2013.01);
(Continued)

(58) Field of Classification Search
CPC .................................................. H04L 65/1069
See application file for complete search history.

(56) References Cited

U.S. PATENT DOCUMENTS 8,374,587 B2    2/2013  Kampmann et al.
9,137,187 B1 *  9/2015  Goepp ............... H04L 51/12
(Continued)

FOREIGN PATENT DOCUMENTS

CN    101064863 A    10/2007
CN    101119292 A    2/2008
(Continued)

OTHER PUBLICATIONS

RFC 3551 RTP Profile for Audio and Video Conferences with Minimal Control, Jul. 2003 (Year: 2003).*
(Continued)

*Primary Examiner* — Adnan M Mirza
(74) *Attorney, Agent, or Firm* — Paradice & Li LLP

(57) ABSTRACT

Methods and apparatus are disclosed for session initiation in a conference. In one aspect, a method for communicating between multiple parties is disclosed. The method comprises generating, at a first device, a first message for transmission to a second device. The method further comprises receiving, at the first device, a second message for establishing a conference. The second message includes a list of one or more concurrent codec capabilities supported by the second device. The list of one or more concurrent codec capabilities supported by the second device comprises an indication of whether one or more resources usable for one or more concurrent instances of a first listed codec may instead be used for one or more concurrent instances of a second listed codec.

52 Claims, 8 Drawing Sheets

(51) Int. Cl.
  *H04N 7/15* (2006.01)
  *H04N 7/14* (2006.01)
(52) U.S. Cl.
  CPC .......... *H04L 65/403* (2013.01); *H04L 65/607*
       (2013.01); *H04L 65/608* (2013.01); *H04L*
          *67/141* (2013.01); *H04L 67/28* (2013.01);
       *H04L 69/24* (2013.01); *H04N 7/15* (2013.01);
        *H04N 7/147* (2013.01); *H04N 7/152* (2013.01)

(56) References Cited

U.S. PATENT DOCUMENTS

| | | | |
|---|---|---|---|
| 10,063,609 | B2 | 8/2018 | Leung et al. |
| 2003/0115332 | A1 | 6/2003 | Honeisen |
| 2006/0168637 | A1* | 7/2006 | Vysotsky ............ H04L 12/1813 725/116 |
| 2012/0300015 | A1 | 11/2012 | Chen et al. |
| 2015/0229487 | A1 | 8/2015 | Lickliter et al. |
| 2016/0277471 | A1 | 9/2016 | Coulombe |
| 2017/0054777 | A1 | 2/2017 | Leung et al. |

FOREIGN PATENT DOCUMENTS

| | | |
|---|---|---|
| CN | 100553329 C | 10/2009 |
| CN | 102710617 A | 10/2012 |
| JP | 2016054336 A | 4/2016 |
| KR | 100734408 B1 | 7/2007 |
| WO | WO-2006019380 A1 | 2/2006 |
| WO | WO-2010117326 A1 | 10/2010 |
| WO | WO-2015129181 A1 | 9/2015 |
| WO | WO-2017030802 A1 | 2/2017 |

OTHER PUBLICATIONS

Unknown: "RTP Audio Video Profile Contents", Apr. 15, 2016, XP55486149, pp. 1-7, Retrieved from the Internet: URL:https://en.wikipedia.org/w/index.php?title=RTP_audio_video_profile&oldid=715413898 [retrieved on Aug. 2, 2018].

Rosenberg, J. et al.: "RFC 3264—An Offer/Answer Model with SDP", Jun. 30, 2002, XP055409643, Retrieved from the Internet: URL:https://tools.ietf.org/html /rfc3264 [retrieved on Sep. 25, 2017], pp. 1-50.

International Search Report and Written Opinion—PCT/US2017/042892—ISA/EPO—Oct. 4, 2017.

"Network Working Group, RFC3389": Real-time Transport Protocol (RTP) Payload for Comfort Noise (CN), Sep. 30, 2002, URL: https://tools.ietf.org/html/rfc3389. 8 pages.

3GPP TS 26.114, "3rd Generation Partnership Project, Technical Specification Group Services and System Aspects, IP Multimedia Subsystem (IMS), Multimedia Telephony, Media Handling and Interaction (Release 14)", 3GPP TS 26.114, V14.2.0, Dec. 2016, pp. 1-380.

ETSI TS 126 114, "Universal Mobile Telecommunications System (UMTS), LTE, IP Multimedia Subsystem (IMS), Multimedia Telephony, Media Handling and Interaction (3GPP TS 26.114 version 14.3.0 Release 14)", Apr. 2017, 399 pages.

Handley M., et al., "SDP: Session Description Protocol," Network Working Group, RFC 4566, Obsoletes 2327, 3266, Jul. 2006, 50 Pages.

Qualcomm Incorporated: "Compact Concurrent Codec Capabilities SDP Usage for MMCMH CCCEx and Session Initiation", S4-161336 Revision of S4-161188, 3GPP TSG-SA4 Meeting #91, Bangalore, India, Oct. 24-28, 2016, Change Request, 5 pages.

Rosenberg J., et al., "An Offer/Answer Model with the Session Description Protocol (SDP)", rfc3264.txt, Obsoletes 2543, 5th JCT-VC Meeting, 96th MPEG Meeting, Mar. 16, 2021-Mar. 23, 2021, Geneva, (Joint Collaborative Team on Video Coding of ISO/IEC JTC1/SC29/WG11 and ITU-T SG.16), Internet Engineering Task Force, IETF, CH, Jun. 1, 2002 (Jun. 1, 2002), XP015009042, 26 pages, URL:http://wftp3.itu.int/av-arch/jctvc-site/, ISSN: 0000-0003.

Sjoberg R., et al., "Overview of HEVC High-Level Syntax and Reference Picture Management," IEEE Transactions on Circuits and Systems for Video Technology, vol. 22, No. 12, Dec. 1, 2012, XP011486337, pp. 1858-1870.

* cited by examiner

METHODS AND APPARATUS FOR USE OF COMPACT CONCURRENT CODECS IN MULTIMEDIA COMMUNICATIONS

CROSS-REFERENCE TO RELATED APPLICATIONS

This application claims the benefit of U.S. Provisional Application No. 62/365,348, filed Jul. 21, 2016, and U.S. Provisional Application No. 62/381,559, filed Aug. 30, 2016, both of which are hereby incorporated by reference under 37 CFR 1.57 in their entireties.

FIELD

This disclosure relates to the field of codec negotiation, and particularly to compact concurrent codec negotiation in decentralized multimedia conferences and communications.

BACKGROUND

Digital video and audio capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video and audio devices implement video and audio compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video and audio devices may transmit, receive, encode, decode, and/or store digital video and audio information more efficiently by implementing such video and audio coding techniques.

Video and audio coding standards, such as Scalable HEVC (SHVC) and Multiview HEVC (MV-HEVC), provide level definitions for defining decoder capability. In the following, the issues and solutions are described based on the existing level definition and other contexts of SHVC at the time when the invention was made, but the solutions apply to MV-HEVC, and other multi-layer codecs as well.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In one aspect, a method for communicating between multiple parties is disclosed. The method comprises generating, at a first device, a first message for transmission to a second device. The method further comprises receiving, at the first device, a second message for establishing a conference. The second message includes a list of one or more concurrent codec capabilities supported by the second device. The list of one or more concurrent codec capabilities supported by the second device comprises an indication of whether one or more resources usable for one or more concurrent instances of a first listed codec may instead be used for one or more concurrent instances of a second listed codec.

Another aspect of the disclosure is an apparatus for initiating a multi-party, multi-stream conference that employs a plurality of codecs. The apparatus comprises a processor and a receiver. The processor is configured to generate a first message for transmission to a first device. The receiver is configured to receive a second message from the first device for establishing a conference. The second message includes a list of one or more concurrent codec capabilities supported by the first device. The list of one or more concurrent codec capabilities supported by the first device comprises an indication of whether one or more resources usable for one or more concurrent instances of a first listed codec may instead be used for one or more concurrent instances of a second listed codec.

Another aspect of the disclosure is an apparatus for initiating a multi-party, multi-stream conference that employs a plurality of codecs. The apparatus comprises means for generating a first message for transmission to a first device and means for receiving a second message from the first device for establishing a conference. The second message includes a list of one or more concurrent codec capabilities supported by the first device. The list of one or more concurrent codec capabilities supported by the first device comprises an indication of whether one or more resources usable for one or more concurrent instances of a first listed codec may instead be used for one or more concurrent instances of a second listed codec.

An additional aspect of the disclosure is a non-transitory computer readable medium comprising instructions that, when executed, cause a processor to perform a method. The method comprises generating, at a first device, a first message for transmission to a second device. The method further comprises receiving, at the first device, a second message for establishing a conference, the second message including a list of one or more concurrent codec capabilities supported by the second device, wherein the list of one or more concurrent codec capabilities supported by the second device comprises an indication of whether one or more resources usable for one or more concurrent instances of a first listed codec may instead be used for one or more concurrent instances of a second listed codec.

DETAILED DESCRIPTION

Figure 1:
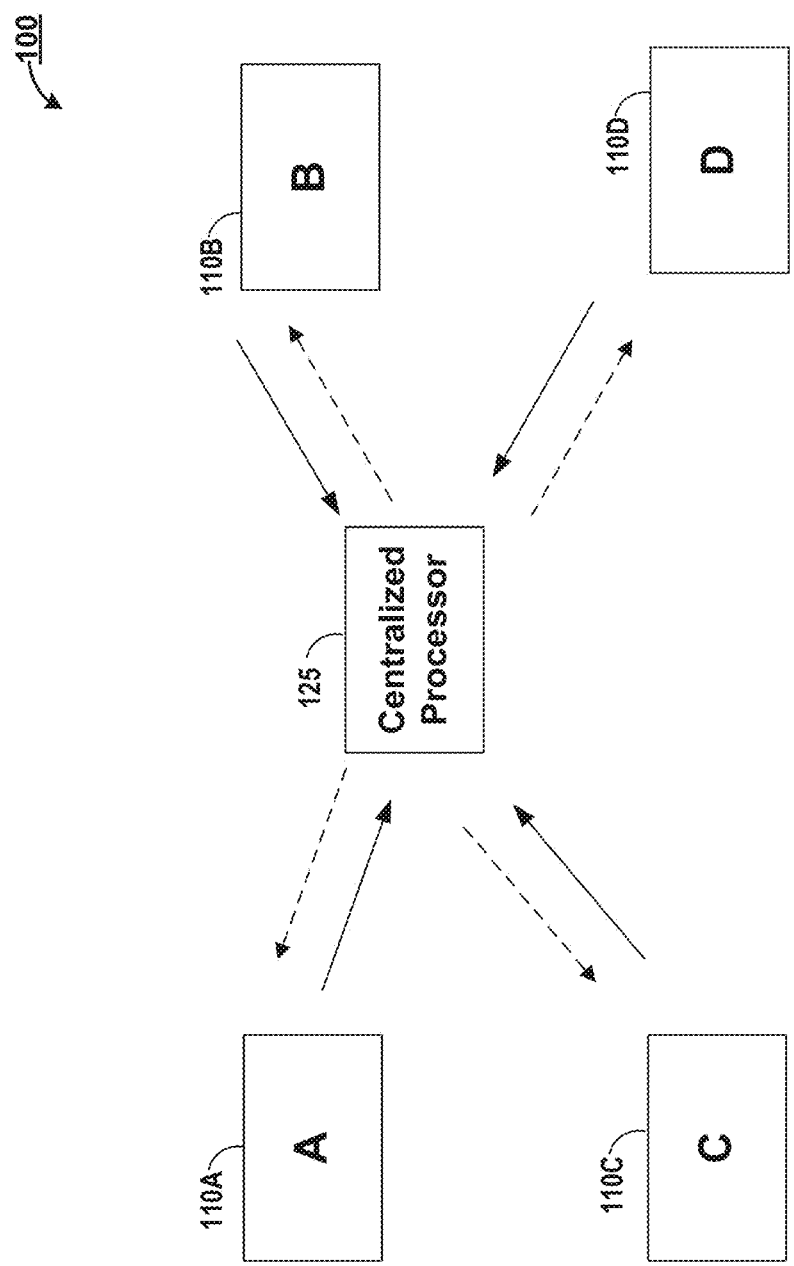
FIG. 1 illustrates an example of a conference architecture for multiple participants.

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a video coding standard, namely High Efficiency Video Coding (HEVC), has been developed by the Joint Collaboration Team on Video Coding (JCT-VC) of ITU-T Video Coding Experts Group (VCEG) and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively. A recent Working Draft (WD) of MV-HEVC will be referred to hereinafter as MV-HEVC WD7. A recent WD of SHVC will be referred to hereinafter as SHVC WD5.

Existing approaches to level definitions sometimes do not provide sufficient information to define decoder capabilities for efficient decoding of multi-layer bitstreams. For example, to decode more than 4 signal-to-noise ratio (SNR) scalable layers (layers having equivalent resolution) of 720p resolution each, a Level 5 decoder or above would be required. Consequently, the luminance coding tree block (CTB) size would be equal to 32×32 or 64×64 (i.e., smaller coding sizes such as 16×16 cannot be used). However, for some layers, such as those having resolutions of 720p or lower, this restriction may result in sub-optimal coding efficiency Decoders may be manufactured in some instances by reusing multiple existing single-layer decoders. In an example, an SHVC decoder consisting of 4 single-layer HEVC Level 3.1 decoders would have to conform to Level 4 or above to decode 4 SNR layers of 720p, per the existing level definition. By this definition, the decoder would have to be able to decode any Level 4 bitstreams. However, barring changes to the decoder hardware, such a decoder would not be able to decode an SHVC Level 4 bitstream with 2 SNR layers of 1080p resolution.

Another issue with the existing HEVC level definition is that a decoder implemented in such a way as to be capable of decoding both a single-layer HEVC bitstream of 1080p and a two-layer SHVC bitstream of 720p would be labeled Level 3.1. However, the Level 3.1 label does not express the capability to decode a single-layer bitstream of 1080p.

In another example, for a decoder implemented using 4 single-layer HEVC 3.1 decoders to be able to decode 4 SNR layers of 720p, per the existing level definition, the decoder would have to conform to Level 4 or above. Thus, the decoder would be required to be able to decode bitstreams having more than 3 tile rows and more than 3 tile columns, each tile having a width of 256 luma samples and height of 144 luma samples. However, the Level 3.1 limits of the decoder would not be able to decode some such bitstreams.

Under the existing design of SHVC, all items in subclause A.4.1 of the HEVC text are specified to be applied to each layer. However, some items are not directly applicable to each layer. For example, for item d on decoded picture buffer (DPB) size, the Sequence Parameter Set (SPS) syntax element is not applicable for enhancement layers. Also, the DPB in SHVC WD5 is a shared-sub-DPB design, thus item d cannot be directly applied to each layer. As another example, for items h and i on Coded Picture Buffer (CPB) size, for bitstream-specific CPB operations, the parameter cannot be applied to each layer.

Bitstream-specific restrictions on CPB size (by items h and i in subclause A.4.1 of HEVC text) are needed. However, the items h and i in subclause A.4.1 of HEVC text cannot be directly applied on bitstream level, because if directly applied, the same CPB size limit for single-layer bitstreams would also be the limit for multi-layer bitstreams. This is not scalable to the number of layers and would only allow for low picture quality when there are many layers.

The restrictions by items b, c, d, g, h, i, and j in subclause A.4.2 of HEVC text are specified to be layer-specific only. However, bitstream-specific restrictions by these items should be specified, regardless of whether their layer-specific counterparts are specified.

While certain embodiments are described herein in the context of the HEVC and/or H.264 standards, one having ordinary skill in the art may appreciate that systems and methods disclosed herein may be applicable to any suitable video coding standard or non-standard video codec design. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG 1 Visual, ITU-T H.262 or ISO/IEC MPEG-2 Visual, ITU-T H.263, ISO/IEC MPEG 4 Visual and ITU-T H.264 (also known as ISO/IEC MPEG-4 AVC), including the scalable and multiview extensions.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video and/or audio data. A "layer" of video data may generally refer to a sequence of pictures having at least one common characteristic or parameter, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed. Video coding standards include those previously recited herein.

Multi-Stream Multiparty Conferencing

In some embodiments, in a multi-stream multiparty conference it may be desirable to support multi-stream video, at least two video contents (e.g., one main and one presentation), multi-stream audio, at least 2 audio contents, as well as other additional capabilities. In some aspects, a centralized processor or bridge may act to support these functions. The centralized processor or bridge may receive the multi-stream video/audio data, mix the video/audio data and send the mixed data stream to each of the participants.

FIG. 1 is a diagram of an exemplary conference architecture 100 for multiple participants. The conference architecture 100 includes terminals 110A-D and the centralized processor 125. In some aspects, the centralized processor 125 may comprise a server or a conference bridge provider. The centralized processor 125 may receive data streams from each of the terminals 110A-D, decode, mix and transmit the mixed data stream to the terminals 110A-D. In some aspects, the centralized processor 125 may transmit the mixed data stream using a multicast transmission. In some embodiments, a data stream may comprise one or more audio, video, and/or media streams. In some aspects, the terminals 110A-D may each comprise one or more of a processor, a receiver, a transmitter, a transceiver, an antenna, a memory, a database, and a user interface.

In some embodiments, it may be desirable to establish a multi-stream multiparty conference without the centralized processor 125. For example, the centralized processor 125 may require separate infrastructure and services that may add cost and/or complexity. In some embodiments, the complexities may be based at least in part on a complexity of one or more media streams of the multi-stream conference. Additionally, participants may be required to establish or register with the centralized processor 125 prior to the multi-stream multiparty conference. Accordingly, it may be desirable for participants to establish a multi-stream multiparty conference on their terminals (e.g., computer, tablet, smartphone, other user equipment, etc.) without using the centralized processor 125 (e.g., decentralized conference).

Figure 2:
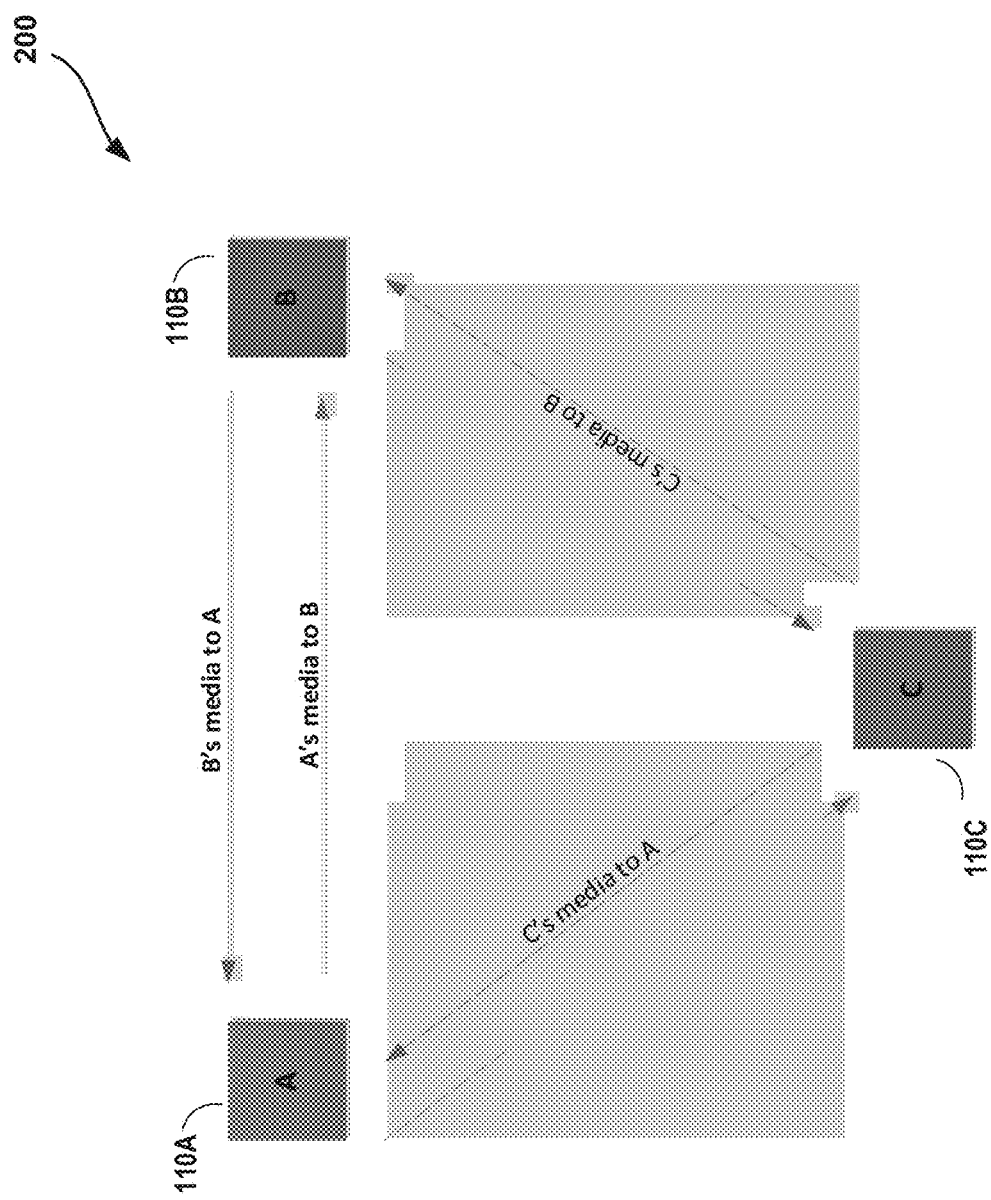
FIG. 2 illustrates an example of a decentralized conference architecture for multiple participants.

FIG. 2 is a diagram of an example of a decentralized conference architecture 200 for multiple participants. As shown in FIG. 2, the decentralized conference architecture 200 may include terminals 110A, 110B, and 110C. The terminals 110A, 110B, and 110C may exchange data streams with each other and may decode, encode, and/or mix the data streams it receives and/or sends. For example, as shown in FIG. 2, participant 110A receives data streams from terminals 110B and 110C and transmits data streams to terminals 110B and 110C. The data streams may comprise media streams, audio streams, video streams, or a combination of such streams. These multiple data streams may be independently and concurrently decoded then mixed together at each terminal, preferably with some perceptual spatial-separation, before rendering the mixed data stream to the viewer or listener. Each of the terminals 110A, 110B, and 110C may have computational limits on the number of decoder/encoder instances that they can operate concurrently. In some aspects, it may be desirable to take these limits into account by a conference initiator when setting up a multi-stream multiparty conference with in-terminal mixing (e.g., a decentralized conference).

As described above with respect to FIG. 2, each of the terminals 110A, 110B, and 110C may be required to concurrently decode multiple data streams received from the other conference participants. Each terminal 110 may have a computational limit to the number of decoder instances it can operate concurrently. This limits the number of participants that can be in a conference with the terminal, or requires that the terminal has the ability to prioritize decoding certain data streams and ignore others. For example, if a terminal does not ignore any data streams it receives, the number participants must be less than or equal to the maximum number of decoders plus one (N<=MaxDec+1). Where N is the number of participants in the conference, including the conference initiator and MaxDec is the maximum number of decoders that can be run concurrently by the terminal. In some embodiments, terminal 110A may initiate a conference by connecting with terminals 110B and 110C and then terminals 110B and 110C may connect with each other to complete the conference.

With reference to FIG. 2, if terminal 110A is the conference initiator, the terminal 110A may use the above calculation to determine how many callers/terminals to invite to the conference (i.e., N−1). Furthermore, if each of the other terminals (e.g., terminals 110B and 110C) does not prioritize and ignore data streams it receives, each terminal may also be able to decode N−1 data streams. Therefore, it may be desirable for the initiator terminal 110A to consider the following limitation: N<=Min [MaxDec of each terminal]+1. Thus, the initiator terminal 110A accounts for the maximum number of decoders that can be run concurrently by each participating terminal in the conference and can ensure that the number of participants does not exceed the smallest maximum number of decoders plus one.

Similarly, conferences with in-terminal mixing can require that a terminal concurrently encode multiple data streams that are sent to the other participating terminals. This can happen when the initiator offers more than one type of codec for a data type and the other participants select to use different codecs. In some aspects, a data type may comprise an audio type, a video type, or other media type.

In either the centralized or decentralized conference architectures described in FIGS. 1 and 2, prior to communicating session description protocol (SDP) offer messages to one or more terminals participating in a conference, the centralized processor or an initiator terminal (depending on the type of architecture) may determine what information to include in the SDP offer message via a pre-SDP negotiation phase. During this negotiation phase, the centralized processor or initiator terminal may request coding and decoding capabilities of other terminals that form the applicable conference architecture. The request for coding and decoding capabilities of the other terminals may be communicated in a discrete negotiation message. The negotiation message may be configured to include information capabilities of the sending terminal or processor as well as information regarding one or more media streams that will be communicated as part of the conference.

In some embodiments, the negotiation message may function as a concurrent codec capabilities exchange (CCCex). In some embodiments, offer messages and answer messages may also function for CCCex, as described herein. The negotiation message, thus, may be implemented to include attributes regarding the coding and decoding capabilities of the transmitting device and/or coding and decoding requirements in view of media streams that may be involved in the conference. Much of the capabilities and requirements information may be included in the SDP offer and response messages communicated between the terminals and centralized processor. However, by performing negotiations or exchange of capabilities prior to communication of the SDP offer and response messages, the SDP offer and response messages may be streamlined and reduced to include only information useful to the establishment of the conference between the devices of the conference architecture. The prior communication and exchange of capabilities is also necessary for the conference initiator to be able to establish a conference that does not exceed the concurrent encoding and decoding capabilities of any one participant. Accordingly, the negotiation messages communicated to exchange concurrent codec capabilities may include at least some of the information that the SDP offer and response messages will include.

The negotiation message may be configured to include the necessary SDP offer and response information in a concatenated form such that the negotiation message(s) may be communicated between the terminals and/or processor efficiently and without placing strain on network and/or processing resources. For example, in the negotiation message, various parameters may be optionally included while they may be always maintained in the SDP offer and response messages. In some embodiments, the negotiation message may convey over 40 lines of information included in the SDP offer and responses messages in a single line message.

In some embodiments, the negotiation message described herein may be sent as a negotiation request message requesting that one or more terminals provide their concurrent codec capabilities. In some embodiments, the negotiation message described herein may be sent as a negotiation response message responding to a negotiation request message. In some embodiments, the negotiation request message may include the capabilities of the terminal or processor sending the request. In some embodiments, the negotiation response message may include capabilities of the responding terminal or processor in relation to the capabilities of the requesting terminal or processor or independent of the capabilities or the requesting terminal or processor. In some embodiments, the negotiation message, as either the request message or response message, may include indications of a list of codec capabilities, as is described in more detail herein.

For example, the negotiation messages that are communicated from an initiator terminal could be defined to include the desired attributes and/or information as follows. Please note the following is an augmented Backus-Naur Form (ABNF) representation of the negotiation message structure:

--- codec_list = "a" "=" "codec_list" ":" codeclist ":" "ENC:" num
    [*63(rule num)] ":" "DEC:" num [*63(rule num)]
codeclist = "{" codec SP [level] SP [profile] "};" *63(";{" codec SP
    [level] SP [profile] "}")
codec = byte-string; byte-string defined in RFC 4566
level = 1*3DIGIT
profile = 1*3DIGIT
rule = ";"/","
num = %d1-16

---

Accordingly, the ABNF code above corresponds to how the negotiation message including the concurrent codec capabilities information may be generated for communication. The negotiation message may include a list of codecs that the entity sending the message is capable of using (e.g., a list of codecs supported by the entity sending the message). In some embodiments, any entity sending the negotiation message (as either a response or a request) is capable of receiving a corresponding negotiation message (either the request or the response).

To reduce the size of the negotiation message in relation to the SDP offer and response messages, various parameters and/or information may be excluded or adapted in the negotiation message. For example, in some embodiments, a codec level parameter that may identify the video codec resolution may be optionally included in the negotiation message, as not all codecs may include codec levels and/or codec level information. Similarly, various other parameters may be optionally included, thus enabling the negotiation message to be reduced in size as compared to the SDP offer and response messages.

Furthermore, the negotiation message may be configured to indicate when or how one or more codecs may be replaced by other codecs (e.g., the resources for one or more codecs may instead by used by the other codecs). For example, the negotiation message may indicate that a centralized terminal is capable of decoding communications via a plurality of codecs. For example, the centralized terminal may indicate that it is capable of decoding enhanced voice services (EVS), adaptive multi-rate (AMR), and adaptive multi-rate wide band (AMR-WB) while indicating that an instance of EVS running on a processor, may be replaced by an instance of AMR-WB, and that an instance of AMR-WB may be replaced by an instance of AMR, as necessary. Additionally, the negotiation message may be further configured to require the same number of <num> instances as <codec> instances (as shown in the message definition herein). In some embodiments, one or more parameters may be excluded from the negotiation message though included in the SDP offer and/or response messages.

In some embodiments, as indicated in the negotiation message definition above, the term <codec> corresponds to the media type name of a codec as defined in the real-time protocol (RTP) payload format for that codec. In some embodiments, examples of the term <codec> may include "video/H264," corresponding to H.264 video compression codecs and/or "video/H265," corresponding to H.265 video compression codecs, respectively. The codecs identified by the term <codec> may correspond to codecs that the terminal or processor sending the negotiating message is configured to utilize in coding and/or decoding media streams. The negotiation message may include one or more codecs identified by the term <codec>; for example, the negotiation message #1 shown herein includes EVS, AMR, and ARM-WB as the codecs identified by the term <codec>.

The term <level>, as noted above, is optional. The term <level> may specify a level of the codec, which for video codecs identifies what resolution is supported. For example, when the term <codec> indicates either H.264 or H.265 codecs, the term <level> may be equal to level_idc or level-id, respectively. When the term <codec> indicates EVS codecs, the term <level> may be equal to 1, 2, 3 and/or 4, which specifies narrowband (NB), WB, super-wide-band (SWB), and full-band (FB), respectively.

Additionally, the term <profile> is also optional in the negotiation message. The term <profile> may specify a profile of the codec, which for video codecs identifies what standardized tools are used by the video encoder. For example, for the codecs H.264 and H.265 indicated by the term <codec>, the term <profile> may indicate or equal profile_idc and profile-id, respectively. If the term <profile> is included in the negotiation message, then the term <level> must also be included. On the other hand, it is permissible for the negotiation message to include the term <level> without including the term <profile>.

The term <rule> of the negotiation message may specify whether or not the resources used for a concurrent instance of the codec may be used instead by a concurrent instance of the codec listed before or after the codec. For example, in the negotiation message #1 described herein, the term <codec> identifies AMR, AMR-WB, and EVS codecs (not necessarily in that order). Based on the term <rule>, a next listed codec may be less computationally complex and, thus, may run on a same processor as the previously listed codec. For example, when the term <rule> is equal to "," then one or more instances of the term <codec> may be replaced by the next one or more listed codecs. However, the term <rule> may also indicate that the next listed codec is more computationally complex or is implemented on a separate processor and, thus, may not run on the same processor as the previously listed codec. For example, when the term <rule> is equal to ";" then one or more instances of the term <codec> may not be replaced by the next listed coded. Accordingly, the term <rule> may be configured to show the terminal and/or processor receiving the negotiation message that the decoding processors are more flexible than the coding processors.

The term <num> shown in the negotiation message #1 herein may specify a maximum number of supported concurrent encoders or decoders. For example, when the term <num> follows the text "ENC" in the negotiation message, the term <num> indicates the maximum number of supported concurrent encoders of each of the codec(s) specified by the term <codec> (at the specified level and profile, when present). Similarly, when the term <num> follows the text "DEC" in the negotiation message, the term <num> indicates a maximum number of supported concurrent decoders of the codec(s) specified by the term <codec> (at the specified level and profile, when present). The number of instances identified by the term <num> that immediately follows the text "ENC" and the number of instances identified by the term <num> that immediately follows the text "DEC" shall both be the same as the number of instances identified by the term <codec>. Furthermore, in some embodiments, an instance identified by the term <num> may be mapped to an instance identified by the term <codec> with the same order.

In some embodiments, the terminal and/or processor may have an ability to trim a number of received media streams (m lines) that it actually decodes. Accordingly, the terminal and/or processor may advertise the term <num> having a value that indicates that the terminal and/or processor can decode a larger number of media streams than it actually has the concurrent decoding capabilities to decode.

According to the description herein, the negotiation message may provide for communication and/or negotiation of concurrent codecs capabilities (including both encoder and decoder capabilities) supported by the terminals and/or processor, in a single SDP line. For example, the Table 1 below depicts a typical SDP offer message. This SDP offer message may correspond to a configuration "A" of the initiator terminal configured as an MSMTSI terminal, as described in relation to Table 2.

TABLE 1

| SDP offer |
| --- |
| \*\*m=audio 49152 RTP/AVP 96 97 98 |
| b=AS:42 |
| a=tcap:1 RTP/AVPF |
| a=pcfg:1 t=1 |
| \*\*a=rtpmap:96 EVS/16000/1 |
| \*\*a=fmtp:96 br=13.2-24.4; bw=wb-swb; max-red=220 |
| \*\*a=rtpmap:97 AMR-WB/16000/1 |
| \*\*a=fmtp:97 mode-change-capability=2; max-red=220 |
| \*\*a=rtpmap:98 AMR/8000/1 |
| \*\*a=fmtp:98 mode-change-capability=2; max-red=220 |
| a=ptime:20 |
| a=maxptime:240 |
| \*\*a=simulcast: send pt:96;97;98 recv pt:96,97,98 |
| \*\*m=audio 49154 RTP/AVP 101 102 103 |
| b=AS:42 |
| a=tcap:1 RTP/AVPF |
| a=pcfg:1 t=1 |
| \*\*a=recvonly |
| \*\*a=rtpmap:101 EVS/16000/1 |
| \*\*a=fmtp:101 br=13.2-24.4; bw=wb-swb; max-red=220 |
| \*\*a=rtpmap:102 AMR-WB/16000/1 |
| \*\*a=fmtp:102 mode-change-capability=2; max-red=220 |
| \*\*a=rtpmap:103 AMR/8000/1 |

TABLE 1-continued

SDP offer

```
**a=fmtp:103 mode-change-capability=2; max-red=220
a=ptime:20
a=maxptime:240
**a=simulcast: recv pt:101,102,103
**m=audio 49156 RTP/AVPF 104 105 106
b=AS:42
a=tcap:1 RTP/AVPF
a=pcfg:1 t=1
**a=recvonly
**a=rtpmap:104 EVS/16000/1
**a=fmtp:104 br=13.2-24.4; bw=wb-swb; max-red=220
**a=rtpmap:105 AMR-WB/16000/1
**a=fmtp:105 mode-change-capability=2; max-red=220
**a=rtpmap:106 AMR/8000/1
**a=fmtp:106 mode-change-capability=2; max-red=220
a=ptime:20
a=maxptime: 240
**a=simulcast: recv pt: 104,105,106
**m=audio 49158 RTP/AVP 107 108
b=AS:42
a=tcap:1 RTP/AVPF
a=pcfg:1 t=1
**a=recvonly
**a=rtpmap:107 AMR-WB/16000/1
**a=fmtp:107 mode-change-capability=2; max-red=220
**a=rtpmap:108 AMR/8000/1
**a=fmtp:108 mode-change-capability=2; max-red=220
a=ptime:20
a=maxptime:240
**a=simulcast: recv pt:107,108
**m=audio 49160 RTP/AVPF 109
b=AS:29
a=tcap:1 RTP/AVPF
a=pcfg:1 t=1
**a=recvonly
**a=rtpmap:109 AMR/8000/1
**a=fmtp:109 mode-change-capability=2; max-red=220
a=ptime:20
a=maxptime: 240
**a=simulcast: recv pt:109
```

As shown, the SDP offer message includes over 40 SDP lines. Many of these SDP lines may include information that is included in the negotiation message described herein. However, while these lines may comprise nearly 40 individual SDP lines in the SDP offer message, the negotiation message described herein may reduce these 40 lines to a single line. Such a reduction of the extensive SDP offer message reduces a number of communication and computing resources otherwise required at each of the terminals and/or processor to receive, process, and respond to the SDP offer and response messages. For example, the negotiation message described herein reduces the SDP offer messages lines offset with "**" in the Table 1 above (equaling 38 SDP lines) to the single line negotiation message #1:

NEGOTIATION MESSAGE #1
a=codec_list:EVS;AMR-WB;AMR:ENC:1;1;1:DEC:3, 1,1

Furthermore, the SDP offer messages for configurations "B" and "C" shown in Table 2 below may also be similarly reduced when communicated in a negotiation message. For example, 42 SDP lines for the SDP offer message of combination "B" below may be replaced by the single SDP line of the negotiation message #2:

NEGOTIATION MESSAGE #2
a=codec_list:EVS;AMR-WB;AMR:ENC:1;1;0:DEC:4, 1,0

Similarly, 44 SDP lines of the SDP offer message of combination "C" below may be replaced by the single SDP line of the negotiation message #3:

NEGOTIATION MESSAGE #3
a=codec_list:EVS;AMR-WB;AMR:ENC:1;0;0:DEC:5, 0,0

TABLE 2

Example Concurrent Codec Capability configurations in the MSMTSI terminal

| Number of participants | | CCCEx combinations supported at the MSMTSI terminal |
|---|---|---|
| N = 6 | A. | [Encoder/send: AMR, AMR-WB, EVS] [Decoder/recv: 1 AMR, 1 AMR-WB, 3 EVS] |
| | B. | [Encoder/send: AMR-WB, EVS] [Decoder/recv: 1 AMR-WB, 4 EVS] |
| | C. | [Encoder/send: EVS] [Decoder/recv: 5 EVS] |

Accordingly, in total, utilizing negotiation messages as described herein may communicate 124 of SDP lines in three SDP lines while maintaining CCCex with six participants (as noted in Table 2), equating to a greater than 41:1 reduction in communication overhead. Accordingly, using the negotiation message described herein may generally reduce SDP lines according to the compression ratio below:

Compression Ratio $1 \geq (5*(N-2)+4): 1$, where

N is the number concurrent decoders (e.g., users); and
m is the number of combinations of codecs that support the concurrent decoders.

Thus, significant communication and processing overhead and resource savings may be provided.

In some embodiments, to further reduce communication and computation resources, a terminal may be configured to "trim" a number of received streams prior to decoding them. Trimming may involve reducing the number of received streams that will be decoded, and may save decoding computation resources at the terminal. Such "trimming" capabilities may be indicated by a terminal broadcasting SDP offers by listing more media streams (e.g., m lines) than the terminal is capable of decoding concurrently. Thus, such a terminal may be configured to generate new compact SDP attributes to include up to 12 or more concurrent decoders, increasing the compression ratio to $\geq 54:1$.

In some embodiments, once the negotiation messages are exchanged as described above, one or more of the terminals or processors may generate and communicate one or more offer messages and/or data streams, as described further herein, for communication to one or more other terminals or devices. In some embodiments, the indications of a list of codec capabilities may be used for selecting a type of codec for communication, as is described in further detail herein. For example, a negotiation response message may indicate which codecs a terminal is configured to handle, and the processor (or initiator terminal) may select a codec type based on the indications of the negotiation response message. In some embodiments, the indicators or indications of the list of codec capabilities for any given processor or terminal may be stored and/or retrieved from a database or other storage location. In some embodiments, a list of codec capabilities supported by a conference may be based, at least in part, on the indication(s) of the list of codec capabilities supported by each of two or more devices.

Figure 3:
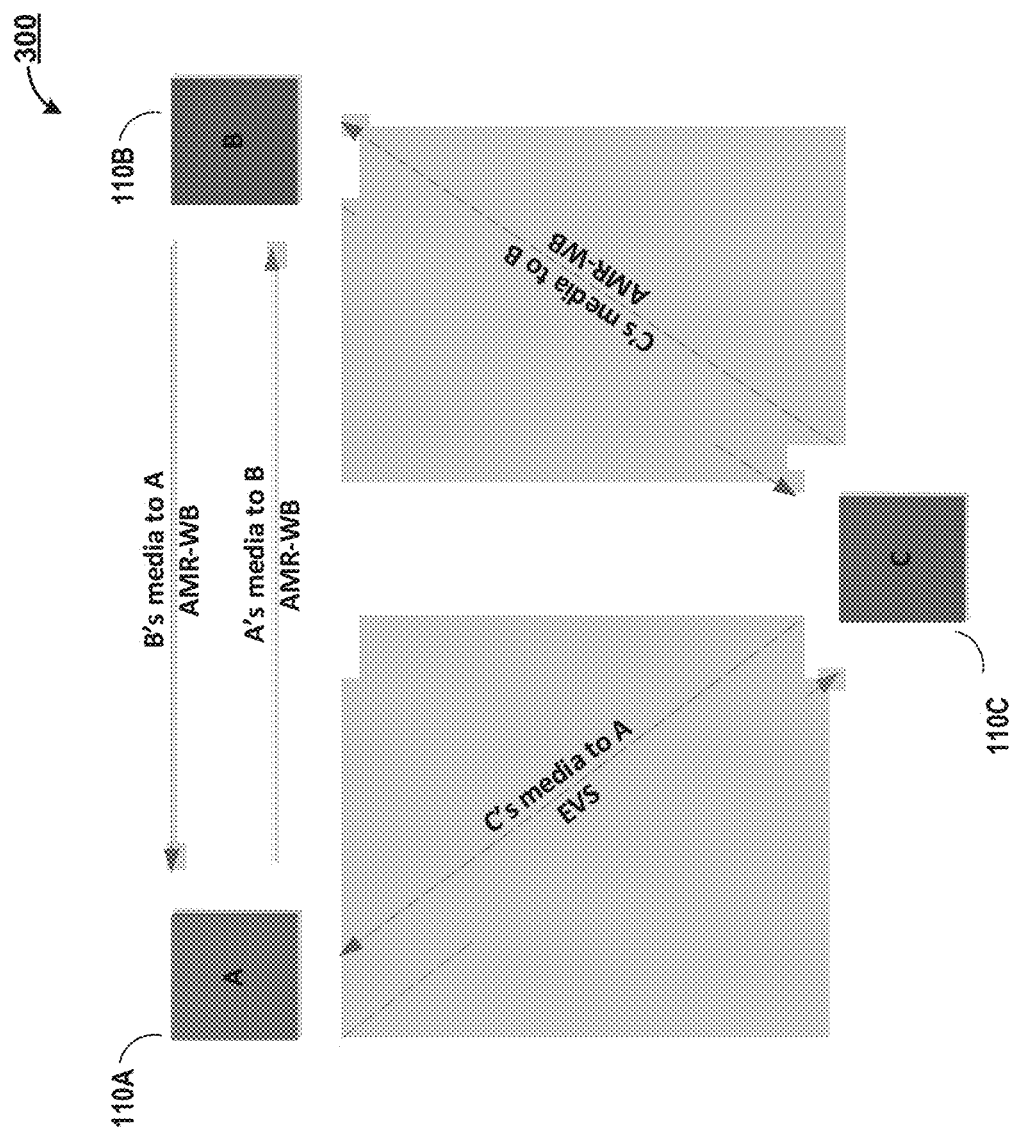
FIG. 3 illustrates another example of a decentralized conference architecture for multiple participants.

FIG. 3 illustrates another example of a decentralized conference architecture 300 for multiple participants. In some embodiments, the initiator terminal 110A may offer multiple codecs to the terminals 110B and 110C. The offers may be communicated after negotiations using the negotiation messages described above are completed. For example, as shown in FIG. 3, the terminal 110A offers both an enhanced voice services (EVS) codec and an adaptive multi-rate wideband (AMR-WB) to terminals 110B and 110C. In some aspects, the offer may comprise a session description protocol (SDP) offer message. As shown, terminal 110C supports EVS and responds with a message selecting EVS. Terminal 110B may only support AMR-WB and select AMR-WB in its response to terminal 110A. In some aspects, the messages terminals 110B and 110C send in response to the offer from terminal 110A may comprise an SDP answer message. Terminals 110B and 110C may also perform their own codec negotiation (e.g., set-up via the session initiation protocol (SIP) REFER method from terminal 110A) in which they choose AMR-WB since terminal 110B does not support EVS. As can be seen from FIG. 3, terminals 110A and 110C have to both encode their content in the EVS and AMR-WB formats concurrently while terminal 110B need only encode/decode in the AMR-WB format.

Figure 4:
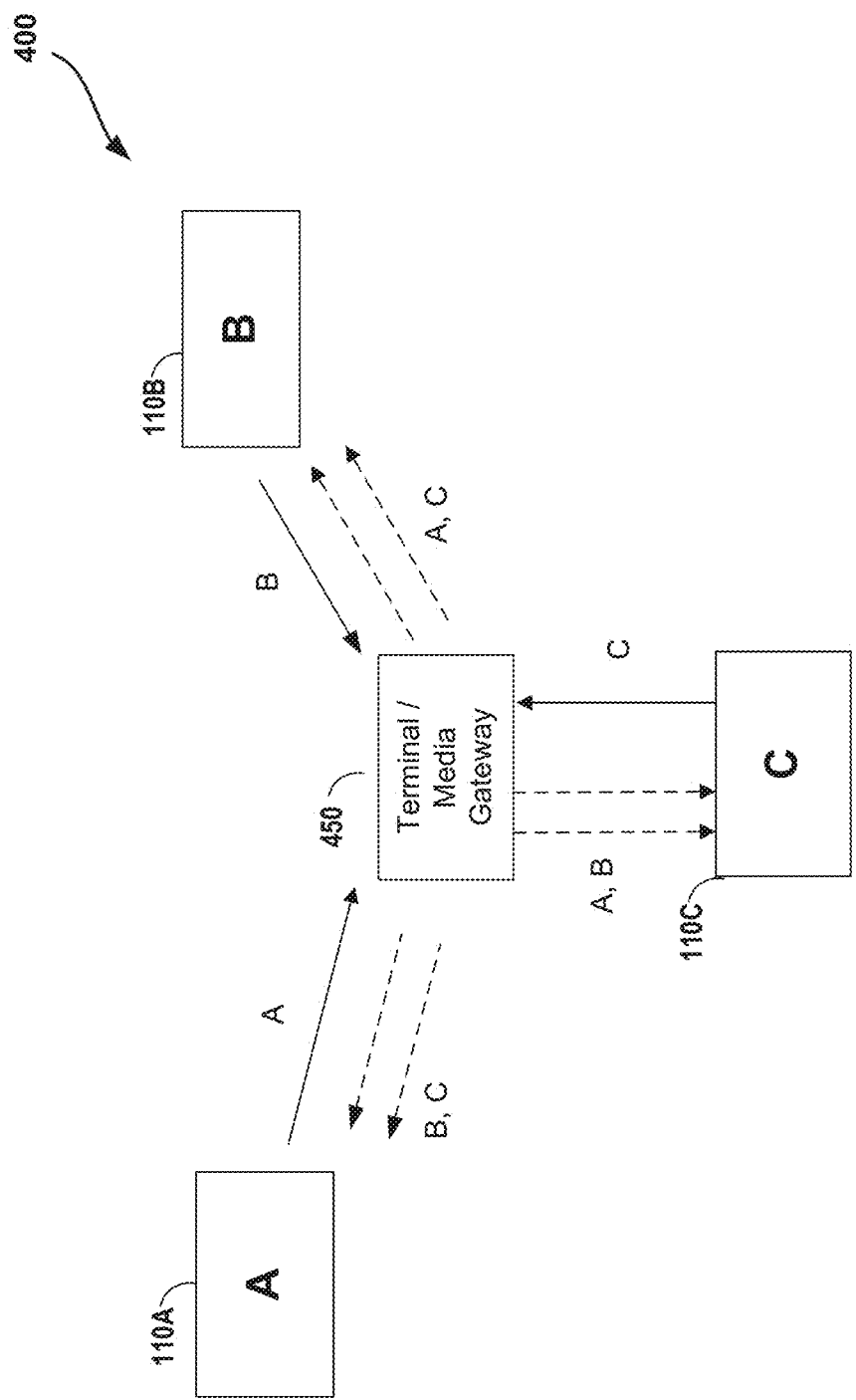
FIG. 4 illustrates an example of a hybrid conference architecture for multiple participants where a terminal functions as a mixer.

FIG. 4 is a diagram of an exemplary hybrid conference architecture 400 for multiple participants where a terminal/media gateway 450 functions as a mixer. As shown in FIG. 4, terminals 110A-C may each send a data stream to the terminal/media gateway 450 which then sends multiple data streams to the terminals 110A-C. For example, terminal/media gateway 450 may receive data streams from terminals 110B and 110C, decode and send those data streams to terminal 110A. In some aspects, terminal/media gateway 450 may mix the data streams from terminals 110B and 110C and send a mixed data stream to terminal 110A.

In one implementation, terminal 110A may adjust the number of data streams it receives from the terminal/media gateway 450 based on certain limitations or conference parameters. For example, terminal 110A may utilize the terminal/media gateway 450 (or centralized processor 125 of FIG. 1) processing capabilities to reduce or off-load its own processing or ensure efficient communication within the conference architecture (either centralized, decentralized, or hybrid) limitations. In one aspect, the terminal 110A may request the terminal/media gateway 450 to only send one mixed data stream because the terminal 110A may only be capable of decoding one data stream or because the terminal 110A has limited processing power.

Additionally, it may be possible for terminals 110A-D, the centralized processor 125, and/or the terminal/media gateway 450 in FIGS. 1-4 (and FIG. 5 below) to switch capabilities. For example, the terminals 110A-D and the centralized processor 125 may be operating in the conference architecture 100 of FIG. 1 and the centralized processor 125 may lose power or lose mixing capabilities. In some aspects, the terminal 110D may switch from operating as a conference participant into operating as the non-participating terminal/media gateway 450 of FIG. 4, essentially replacing the centralized processor 125 functions. Additionally, the terminal/media gateway 450 of FIG. 4 may also operate as a participating terminal/media gateway 450 in the conference by sending its own data streams to one or more participants in the conference (e.g., terminals 110A-D). Accordingly, each of the terminals 110A-D, the centralized processor 125, and/or the terminal/media gateway 450 may be configured to operate in one or more of the centralized conference architecture 100 of FIG. 1, the decentralized conference architectures 200 and 300 of FIGS. 2 and 3, and the hybrid conference architecture 400 of FIG. 4.

In one example, a conference (e.g., conference architectures 100, 200, 300, 400, and 500 [discussed below]) may have a conference duration that comprises a first duration and a second duration. In some aspects, during the first duration terminal 110D may operate as a conference participant as illustrated in FIG. 1. In some aspects, during the second duration, the terminal 110D may switch to operating as the terminal/media gateway 450 as depicted in FIG. 4 (and FIG. 5 below). In some aspects, the terminal 110D may request to switch operating functions to the centralized processor 125, to one or more of the terminals 110A-C (as illustrated in FIG. 1), or to another controller or device. In other aspects, the centralized processor 125 or one or more of the terminals 110A-C (as illustrated in FIG. 1) may determine that terminal 110D is capable of switching to operating as the terminal/media gateway 450.

In some aspects, a conference initiation or association may occur during the first duration and an exchange of conference data may occur during the second duration. For example, with respect to FIGS. 2 and 3 the terminal 110A, during the first duration, may transmit an offer message to terminals 110B and 110C including a list of codec capabilities supported by terminal 110A. The terminal 110A may receive a response message from each of the terminals 110B and 110C. The response message may include a list of codec capabilities of the respective terminal 110B or 110C and a codec type selected by the terminals 110B and 110C. The terminal 110A may determine whether each of the terminals 110B and 110C can participate in the conference based on the list of codec capabilities in each of the response messages. During the second duration, the terminals 110A-C may exchange data streams amongst each other.

In some aspects, the centralized processor 125 or one or more of the terminals 110A-C may request that the terminal 110D switch to operating as the terminal/media gateway 450. In some embodiments, the request may be based on the terminal 110D's encoding/decoding capabilities and/or based on the centralized processor 125 or one or more of the terminals 110A-C encoding/decoding capabilities. For example, the terminal 110A may determine that it can only receive two data streams and may request the terminal 110D to switch operations. The request may include requesting that the terminal 110D process and mix communications from terminals 110B and 110C and that terminal 110D send the mixed data stream to terminal 110A. In some aspects, the request may be transmitted to terminals 110B and 110C from one of terminal 110A, 110D, or the centralized processor 125 indicating that the new conference identifier or conference uniform resource identifier (URI) for terminals 110B and 110C is an address for terminal 110D. In some aspects, the request or the indication of the new destination (i.e., terminal 110D) for processing and mixing data streams for terminals 110B and 110C may be sent via an out of band communication. In response to the request, terminals 110B and 110C may then switch from sending data streams to the centralized processor 125 to sending data streams to the terminal 110D. In order to reduce potential latency issues involved with the switch, terminals 110B and 110C may send data streams to both the centralized processor 125 and terminal 110D until a time where the centralized processor 125 and/or terminal 110D determine that the switch is complete.

Figure 5:
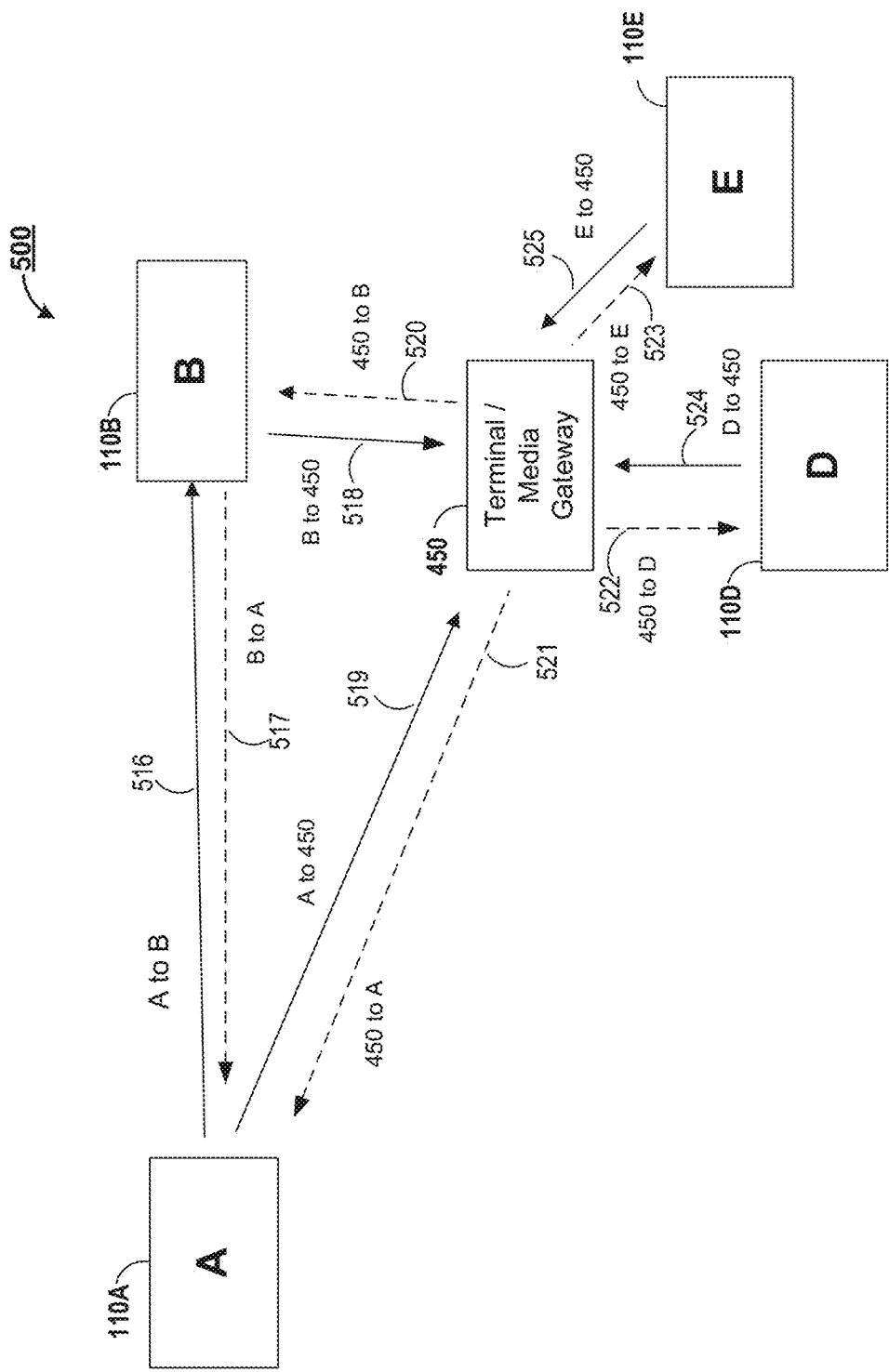
FIG. 5 illustrates an example of a hybrid conference architecture for multiple participants where a terminal functions as a mixer and participant.

FIG. 5 is a diagram of an exemplary hybrid conference architecture 500 for multiple participants where the terminal/media gateway 450 functions as a mixer and participant. As shown in FIG. 5, terminal 110A may initiate a conference with terminal 110B, terminal/media gateway 450, and terminals 110D-E as participants in the conference. Terminal 110A may initiate a conference by any method such that the participants (terminal 110B, terminal/media gateway 450, and terminals 110D-E) join the conference. For example, the terminal 110A may initiate the conference using an out of band communication with the participants (e.g., email communication indicating the conference and/or a conference bridge). In some aspects, terminal 110A may also initiate the conference by employing the REFER method described above for terminal 110B and terminal/media gateway 450 in combination with an out of band communication to terminals 110D and 110E for those terminals to join the conference via the terminal/media gateway 450. In other aspects, the terminal 110A may initiate the conference through a poll message announcing a start of the conference and the terminals 110B and 110D-E and the terminal/media gateway 450 may transmit a message with their codec capabilities to join the conference. As described above, other methods to initiate the conference are also possible.

As discussed above with respect to FIGS. 1-4, terminal 110A may consider the encoding/decoding capabilities of each of the participants when initiating the conference. In FIG. 5, terminal 110A may transmit data stream 516 to terminal 110B, transmit data stream 519 to terminal/media gateway 450, and receive data streams 517 and 521 from terminal 110B and terminal/media gateway 450, respectively. Terminal 110B may also transmit data stream 518 to terminal/media gateway 450 and receive data stream 520 from terminal/media gateway 450. Terminal/media gateway 450 may also receive data streams 524 and 525 from terminals 110D and 110E, respectively, and transmit data streams 522 and 523 to terminals 110D and 110E, respectively. Each of the data streams 516-525 may comprise one or more audio and/or video (media) streams.

In some embodiments, terminal/media gateway 450 functions as both mixer and participant in a conference. For example, terminal/media gateway 450 may receive data stream 519 from terminal 110A, data stream 518 from terminal 110B, data stream 524 from terminal 110D, and data stream 525 from terminal 110E. In some aspects, terminals 110D and 110E may only be able to decode one data stream each while terminals 110A and 110B may each be able to decode three data streams. In some aspects, terminals 110A and 110B may be considered new or high efficiency terminals compared to terminals 110D and 110E. In some aspects, terminals 110D and 110E may be considered legacy or older devices than terminals 110A and 110B. In one embodiment, terminal/media gateway 450 may transmit a single mixed data stream 522 to terminal 110D and a single mixed data stream 523 to terminal 110E. In some aspects, the terminal/media gateway 450 may transmit a multicast mixed data stream to terminals 110D and 110E while concurrently sending unicast data streams 521 and 520 to terminals 110A and 110B. Additionally, terminal/media gateway 450 may transmit data stream 521 to terminal 110A which may comprise a data stream from terminal 110B, a data stream from terminal/media gateway 450, and a mixed data stream from terminals 110D and 110E.

In other aspects, terminal/media gateway 450 may transmit other combinations of data streams from the other participants in the conference. For example, terminal/media gateway 450 may ignore the data stream from terminal 110E and transmit only the data streams from terminals 110B, 110D, and terminal/media gateway 450 to terminal 110A. Terminal/media gateway 450 (and any of the terminals 110A, 110B, 110D, and 110E) may prioritize, select, and/or ignore certain data streams in accordance with any of the implementations or combinations described herein. In another example embodiment, the terminal/media gateway 450 may receive data streams from terminals and identify the streams that are active speech (e.g., 110B, 110C) and that are background/inactive speech (e.g., 110D, 110E). The terminal/media gateway 450 may choose to decode and mix the DTX/inactive frames and transmit as one inactive frame along with the multiple active frames (e.g., to terminal 110A). In a multi-party conference with large number of participants (e.g., N>10), the above discussed selective pre-parsing and mixing of DTX/inactive frames at the terminal/gateway 450 may reduce the number of multiple streams received at a terminal for processing. The receiving terminal (e.g., 110A) may now have fewer streams to inspect and prioritize for decoding. In another example embodiment, the terminal/media gateway 450 may determine the corresponding video streams associated with the DTX/inactive frames and perform tiling/re-encoding of those video/image data streams into one video stream, thereby reducing the number of multiple video streams received at a terminal for processing.

As discussed above with respect to FIG. 4, in some aspects, any of the terminals 110A, 110B, 110D, 110E and the terminal/media gateway 450 of FIG. 5 may switch operating functions in a variety of ways. For example, terminal 110B and the terminal/media gateway 450 may determine (e.g., via out of band communication or through analysis of codec capabilities) to transfer mixing operations of the terminal/media gateway 450 to terminal 110B. In some aspects, the terminal/media gateway 450 and/or the terminal 110B may broadcast to the other conference participants either directly or indirectly (e.g., out of band or through another terminal) that terminal 110B is taking over the processing and mixing operations of the terminal/media gateway 450. While terminal 110B is discussed as taking over the processing operations of the terminal/media gateway 450, in other embodiments, any of the terminals 110A, 110D, or 110E, or another device, may similarly replace the terminal/media gateway 450's processing and/or mixing operations.

In other embodiments, the terminal/media gateway 450 may utilize the REFER method to broadcast to the other conference participants to transfer the conference data streams that the conference participant is sending to the terminal/media gateway 450 to now send the conference data streams to terminal 110B. In addition, the conference participants may send their respective data streams to both the terminal/media gateway 450 and terminal 110B for a period of time until all conference participants are transmitting their data streams to terminal 110B. Similarly, the terminal/media gateway 450 and terminal 110B may for a period of time both concurrently process and mix multiple data streams they receive from the other conference participants until the terminal/media gateway 450 and/or terminal 110B have determined that all terminals have switched over in order to reduce potential interruption or latency issues.

In some embodiments, there may be a trade-off between the granularity of the information to be provided and the ability to indicate the capability to support more concurrent operations. There may be scenarios or devices where vendors or operators wish to communicate detailed information about the concurrent sessions that can be supported, e.g., high-end business terminals specifically designed for multi-party conferencing. On the other hand, there may be mid- to low-end terminals that are not designed to support more than three-to-four participants in a session which the vendor or operator only wishes to expose very basic functionality. Since the appropriate amount of information to be communicated may depend on the scenario and device, it may be desirable to accommodate the different cases. Instead of choosing one of the formats described above, in some aspects, a terminal (e.g., terminals 110A-E or terminal/media gateway 450) may be able to choose any of the described formats. The initiator terminal (e.g., terminal 110A), who has to receive all the codec capabilities information from the conference participants should be able to decode and understand all the formats.

One example that meets the above format requirements for the codec capabilities information is to communicate a maximum number of concurrent implementations of each data type (e.g., audio or video), or each codec.

Limits per Data Type

For example, new session-level SDP attributes could be defined as follows:

```
a = max_dec_audio:<num_instances>
a = max_dec_video:<num_instances>
a = max_enc_audio:<num_instances>
a = max_enc_video:<num_instances>
```

In some aspects, <num_instances> is an integer, in the range of 1 to 16, inclusive, that specifies the maximum number of concurrent decoders (for the first two) or encoders (for the last two) of that data type (e.g., audio for the 1st and 3rd, or video for the 2nd and 4th) supported by the terminal.

Or, new data-level SDP attributes could be defined as follows:

```
a = max_dec:<num_instances>
a = max_enc:<num_instances>
```

In some aspects, <num_instances> is an integer, in the range of 1 to 16, inclusive, that specifies the maximum number of concurrent decoders (for a=max_dec) or encoders (for a=max_enc) of the data type (of the latest above "m=" line) supported by the terminal.

In some embodiments, this exemplary solution may not meet the format requirements for the codec capabilities information described above. In some aspects, the max number of concurrent instances may be constrained by the most computationally-intensive codec. In an exemplary embodiment, for a video telephony session where the terminal supports a H.265 codec and declares that it can support up to two video encoder occurrences (H.264 and H.265), knowing that it has to reserve enough resources for these two video encoders, the terminal may be limited in the number of decoder instances of data (e.g., video or speech) that it can handle.

In some aspects, the limitations on the number of decoder instances may prevent the terminal from being included in conferences with a larger number of participants using a less complex decoder or may prevent all the participants in a conference from using more advanced optional codecs in the session.

Limits per Codec Type

Additionally, new SDP parameters could be defined as follows:

```
a=max_dec:<codec> <num_instances>
a=max_enc:<codec> <num_instances>
```

In some aspects, <codec> is the data type name of a codec as defined in the RTP payload format for that codec, e.g., "video/H264" for H.264 as defined in IETF RFC 6184 (available here: https://tools.ietf.org/html/rfc6184) and "video/H265" for H.265 as defined in the H.265 RTP payload format (the latest version of which is here: https://tools.ietf.org/html/draft-ietf-payload-rtp-h265-14), respectively. In some aspects, <num_instances> is an integer, in the range of 1 to 16, inclusive, that specifies the maximum number of concurrent decoders (for a=max_dec) or encoders (for a=max_eec) of the specified codec.

In other implementations, to take into consideration that a video codec of different levels can be of different capabilities, new data-level SDP attributes could be defined as follows:

```
a=max_dec:<codec> <level> <num_instances> [<profile>]
a=max_enc:<codec> <level> <num_instances> [<profile>]
```

In some aspects, <codec> is the same as above. In some aspects, <level> specifies the level of the codec, e.g., for H.264 and H.265 the value is equal to level_idc as defined in the ITU-T H.264 specification and level-id as defined in the H.265 RTP payload format (the latest version of which is here: https://tools.ietf.org/html/draft-ietf-payload-rtp-h265-14), respectively, and when the codec is EVS, the value of this field being 1, 2, 3 and 4 specifies NB, WB, SWB and FB, respectively. In some aspects, <num_instances> is an integer, in the range of 1 to 16, inclusive, that specifies the maximum number of concurrent decoders (for a=max_dec) or encoders (for a=max_enc) of the specified codec at the specified level and profile (when present). In some aspects, <profile>, which is optional, specifies the profile of the codec, e.g., for H.264 and H.265 the value is equal to profile_idc as defined in the ITU-T H.264 specification and profile-id as defined in the H.265 RTP payload format (the latest version of which is here: https://tools.ietf.org/html/draft-ietf-payload-rtp-h265-14), respectively.

In some embodiments, for all the above alternatives, a value of 0 may also be allowed for <num_instances>, and the value 0 specifies that the terminal is capable of picking and trimming data streams. In some aspects, the terminal capable of picking and trimming data streams can handle an infinite number of data streams.

In other implementations, another alternative for video codec may be to define a new SDP attribute as follows:

```
a=max_vdec_cap:<codec> <max_block_ps>
a=max_venc_cap:<codec> <max_block_ps>
```

In some aspects, <codec> is the same as above. In some aspects, <max_block_ps> specifies the maximum number of 8×8 luma blocks per second that can be processed by all concurrent video decoders (for a=max_vdec_cap) or encoders (for a=max_venc_cap) of the specified video codec.

In some embodiments, this exemplary solution may not meet the format requirements for the codec capabilities information described above. In some aspects, it may not be clear how the conference initiator terminal (e.g., terminal 110A of FIGS. 2-5) can determine exactly how many concurrent encoders and decoders can be supported when there is a mix of codecs. In some embodiments, a way to estimate how many concurrent encoders and decoders can be supported is to use the encoder/decoder limit of the most computationally taxing codec being used. In some aspects, the encoder/decoder limits may be constrained by the most complex codec, which may limit the number of decoder instances of data (e.g., video or speech) that the terminal can handle. For example, in some aspects, the limitations on the number of decoder instances may prevent the terminal from being included in conferences with a larger number of participants using a less complex decoder or may prevent all the participants in a conference from using more advanced optional codecs in the session.

Another example that meets the above format requirements for the codec capabilities information is to describe the percentage of processor resources available or allocated for each encoding/decoding function. This allows the initiator terminal to mix and match codecs, including those of different data types, along with their encoders and decoders as long as it keeps the total complexity load no larger than 100% of the allocated resources in a given processor. One way to describe the above information may be to introduce two new SDP attributes:

```
a=enc_use:<codec> <alloc_factor> <proc_idx>
a=dec_use:<codec> <alloc_factor> <proc_idx>
``` where <alloc_factor> ranges from 0 to 1.0 and describes the resource allocation factor for the specified codec when using the processor with the processor index <proc_idx> for encoding (for a=enc_use) or decoding (for a=dec_use).

In other embodiments, another way to describe the above information may be to introduce two new SDP attributes:

```
a=enc_use:<codec> <level> <alloc_factor> <proc_idx> [<profile>]
a=dec_use:<codec> <level> <alloc_factor> <proc_idx> [<profile>]
```

In some aspects, <codec>, <level>, and <profile> are the same as above. In some aspects, <alloc_factor> ranges from 0 to 1.0 and describes the resource allocation factor for the specified codec at the specified level when using the processor with the processor index <proc_idx> for encoding (for a=enc_use) or decoding (for a=dec_use). In some embodiments, the initiator terminal may use the above information from each participant to ensure that the proposed conference does not exceed any of the concurrent codec capabilities of the participants.

The information can be conceptualized as follows in Table 1:

TABLE 1

| Data Type | Codec Name | Resource allocation factor for encoder | Resource allocation factor for decoder | proc_num |
|---|---|---|---|---|
| Audio | AMR-NB | 0.1 | 0.02 | 1 |
| Audio | AMR-WB | 0.2 | 0.04 | 1 |
| Audio | EVS (WB) | 0.24 | 0.09 | 2 |
| Audio | EVS (SWB) | 0.28 | 0.12 | 2 |
| Video | AVC/H.264 | 0.6 | 0.15 | 1 |
| Video | HEVC/H.265 | 0.9 | 0.23 | 2 |

Listing Codec Concurrent Codec Combination Profiles

Another exemplary solution that meets the above format requirements for the codec capabilities information is to list all the combinations of codec operations that the terminal can handle simultaneously. This may have the advantage that it does not require communicating the processor loading consumed by each codec function. The Table 2 below gives a non-exhaustive list of supported profiles based on the processor loading factors described in the previous section.

For example, the processor loading factor may comprise the resource allocation factor described above with respect to Table 1. In aspects, selection of a codec type or data type by a terminal may be based on the processor loading factor or the resource allocation factor.

In some embodiments, two new SDP attributes, a=enc_list and a=dec_list are defined (in augmented backus-naur form (ABNF)) as follows:

```
enc_list = "a" "=" "enc_list" ":" combination [*63(";" combination)]
dec_list = "a" "=" "dec_list" ":" combination [*63(";" combination)]
combination = 1*32(num SP codec SP level SP [profile]))
num = %d1-16
codec = byte-string
     ; byte-string defined in RFC 4566
level = 1*3DIGITDIGIT
profile = 1*3DIGIT
```

In some aspects, num specifies the maximum number of supported concurrent encoders (for a=enc_list) or decoders (for a=enc_list) of the specified codec at the specified level and profile (when present) in an entry of the list. In some aspects, codec, level and profile have the same semantics as <codec>, <level> and <profile>, respectively, given above in an entry of the list.

Alternatively, a new SDP attribute may be defined in ABNF as follows:

```
codec_list = "a" "=" "enc_list" ":" function ":" combination
    [*63(";" combination)]
    function = "ENC" / "DEC"
    combination = 1*32(num SP codec SP level SP [profile])
    num = %d1-16
    codec = byte-string
        ; byte-string defined in RFC 4566
    level = 1*3DIGIT
    profile = 1*3DIGIT
```

In some aspects, num specifies the maximum number of supported concurrent encoders (when function="ENC") or decoders (when function="DEC") of the specified codec at the specified level and profile (when present) in an entry of the list. In some embodiments, codec, level and profile have the same semantics as <codec>, <level> and <profile>, respectively, given above.

In other embodiments, a new SDP attribute may be defined in ABNF as follows:

```
codec_list = "a" "=" "codec_list" ":" codeclist ":" "ENC:"
combination [*63(";" combination)] ":" "DEC:" combination [*63(";" combination)]
    codeclist = "{" codec SP level SP [profile] "};" *15("{" codec SP level SP [profile] "}")
    combination = 1*32(num SP codec_idx)
    codec = byte-string
        ; byte-string defined in RFC 4566
    level = 1*3DIGIT
    profile = 1*3DIGIT
    num = %d1-16
    codec_idx = %d1-16
```

In some aspects, codec, level and profile have the same semantics as <codec>, <level> and <profile>, respectively, given above. In some aspects, num specifies the maximum number of supported concurrent encoders (when the combination follows "ENC") or decoders (when the combination follows "DEC") of the specified codec at the specified level and profile (when present). In some aspects, codec_idx specifies that the index to the list codeclist of the specified codec at the specified level and profile (when present).

In some embodiments, num may be defined as num=% d0-16. In addition to the description and equations above, a value of 0 specifies that the terminal is capable of picking and trimming data streams. In some aspects, the terminal capable of picking and trimming data streams can handle an infinite number of data streams.

In other embodiments, in the above alternatives with num in the range of 1 to 16, inclusive, one more new SDP attribute is defined as follows:

a=stream_trimming

In some aspects, the presence of this attribute specifies that the terminal is capable of picking and trimming data streams. In some aspects, the terminal capable of picking and trimming data streams can handle an infinite number of data streams. The value of num in a combination still specifies the maximum number of actually supported concurrent encoders or decoders of a particular codec, profile and level. In this case, the terminal can receive any amount of data streams and can trim the data streams to the amount allowed by the a=codec_list attribute for each codec/profile/level combination.

In some aspects, there can be many codec combinations, increasing exponentially as the number of codecs supported increases. This can increase the message size, e.g., SDP/SIP. For example, some reduction in signalling can be made by applying additional rules such as listing the codec functions in order of decreasing complexity. Then, understanding that if the number of instances of a codec function of a higher complexity is reduced by one, an instance of one of the less complex codec functions on the same processor can be increased by at least one. While in some aspects, this may give a less-than-optimal limit when the codec process whose number of instances is reduced is more complex than the others codec processes, it may allow omitting a number of profiles. In some aspects, concurrent operation of the same video codec may be necessary if the terminal needs to generate a thumbnail that is simulcast with a full resolution image.

Profiles of Supported Concurrent Codec Combinations

The profiles listed in Table 2 may not apply well to use cases that require simulcast of video using the same codec (i.e., low and high resolution images) as only one encoder is supported at a time. This may be a limitation of the processor loading and not the profile scheme itself.

In some embodiments, profiles A through D in Table 2 can be thought of as the "HD Video" profiles that use H.265 at the expense of not allowing use of EVS. Although profiles A through C can handle the decoding of four H.264 streams, they may not be used in typical multi-unicast video conferences because they may only be capable of encoding one video stream. In some aspects, a user of this terminal may wish to only send video to one of the other participants, e.g., a video side bar conversation used for communicating sign language.

Aside from simple 2-party video sessions, profiles A through D may be more applicable to multicasting or "focused-based multicasting" conferences where the H.265 codec is known to be supported by all terminals. Note that Profile C may be considered invalid if AMR-NB is a mandatory codec for the service being offered as AMR-NB decoding is not supported.

In some aspects, profile F can be thought of as the "HD Voice only" profile, to be used in speech-only conferences. Since use cases requiring simultaneous encoding of speech using the same encoder are yet to be identified, the speech-only profiles may only need to consider concurrently operating one instance of each speech encoder. This can simplify the number of profiles that need to be listed for speech-only conferences and profile F appears to be the only relevant speech-only profile as conferences supporting more than 13 participants are unlikely and may very well exceed the RTP stream processing limits of the terminal (described further below).

For terminals that perform trimming or reduction of received media streams without requiring decoding all of them (as further described below), the number of instances of the decoder function can be indicated as "infinity" as follows in Table 3. Table 3 illustrates an exemplary embodiment for a terminal that can trim down to three streams of received audio data:

TABLE 2

| | Encoders | | | | | Decoders | | | | |
| --- | --- | --- | --- | --- | --- | --- | --- | --- | --- | --- |
| | Video | | Audio | | | Video | | Audio | | |
| Profile | H.265 | H.264 | EVS | AMR-WB | AMR-NB | H.265 | H.264 | EVS | AMR-WB | AMR-NB |
| Load Factor | 0.8 | 0.6 | 0.5 | 0.2 | 0.08 | 0.2 | 0.15 | 0.1 | 0.04 | 0.02 |
| A | 1 | | | 1 | 1 | 1 | 4 | | 1 | 4 |
| B | 1 | | | 1 | 1 | 1 | 4 | | 2 | 2 |
| C | 1 | | | 1 | 1 | 1 | 4 | | 3 | |
| D | 1 | | | 1 | 1 | 1 | 1 | | 10 | 8 |
| E | | 1 | 1 | | 1 | 1 | 1 | 3 | 2 | 4 |
| F | | | 1 | 1 | 1 | | | 5 | 12 | 12 |
| G | | 1 | 1 | | 1 | | 2 | 5 | | 1 |
| H | | 1 | 1 | | 1 | 1 | 2 | 3 | | 1 |
| I | | 1 | 1 | | 1 | 1 | 1 | 3 | 2 | 4 |
| ... | | | | | | | | | | |

TABLE 3

| | Encoders | | | | | Decoders | | | | |
|---|---|---|---|---|---|---|---|---|---|---|
| | Video | | Audio | | | Video | | Audio | | |
| Profile | H.265 | H.264 | EVS | AMR-WB | AMR-NB | H.265 | H.264 | EVS | AMR-WB | AMR-NB |
| Load Factor | 0.8 | 0.6 | 0.5 | 0.2 | 0.08 | 0.2 | 0.15 | 0.1 | 0.04 | 0.02 |
| A | 1 | | | 1 | 1 | 1 | 4 | | 1 | Inf |
| B | 1 | | | 1 | 1 | 1 | 4 | | 2 | 2 |
| C | 1 | | | 1 | 1 | 1 | 4 | | Inf | 0 |
| D | 1 | | | 1 | 1 | 1 | 1 | | Inf | Inf |
| E | | 1 | 1 | | 1 | 1 | 1 | Inf | 2 | Inf |
| F | | | 1 | 1 | 1 | | | Inf | Inf | Inf |
| G | | 1 | 1 | | 1 | | 2 | Inf | | 1 |
| H | | 1 | 1 | | 1 | 1 | 2 | Inf | | 1 |
| I | | 1 | 1 | | 1 | 1 | 1 | Inf | 2 | Inf |
| ... | | | | | | | | | | |

As noted above with reference to FIGS. 1-5, a receiving terminal or device (e.g., terminal 110B, terminal/media gateway 450, etc.) can prioritize and ignore particular data streams to reduce the number decoder instances it has to concurrently operate/decode. If a terminal employs such a "trimming" algorithm and is able to limit the number of data streams it has to decode to match its concurrent decoding capabilities, then the terminal does not require the conference initiator to limit the number of participants in the call based on the terminal's decoding capabilities. In this case the terminal can indicate a resource allocation factor of 0 corresponding to such data streams as illustrated in the following example of Table 4:

TABLE 4

| Data Type | Codec Name | Resource allocation factor for encoder | Resource allocation factor for decoder | proc_num |
|---|---|---|---|---|
| Audio | AMR-NB | 0.1 | 0 | 1 |
| Audio | AMR-WB | 0.2 | 0 | 1 |
| Audio | EVS (WB) | 0.24 | 0 | 2 |
| Audio | EVS (SWB) | 0.28 | 0 | 2 |
| Video | AVC/H.264 | 0.6 | 0.15 | 1 |
| Video | HEVC/H.265 | 0.9 | 0.23 | 2 |

RTP Stream Processing Limits

The ability to support the concurrent decoding of many data streams makes it likely that decoding may not be the limiting factor in setting the size of a conference. The number of real-time transport protocol (RTP) data streams that can be handled by the terminal's protocol stack becomes the limiting factor. Therefore it may be beneficial to also communicate this information. Furthermore, two new session-level SDP attributes can be defined to specify the limits on the number of concurrent RTP stacks:

```
a=rtp_tx_limit:<rtp_instances>
a=rtp_rx_limit:<rtp_instances>
```

In some aspects, <rtp_instances> is an integer in the range of 1 to 32, inclusive, that specifies the maximum number of concurrent RTP sessions supported. In some aspects, conference initiator terminal (e.g., terminal 110A of FIGS. 2-5) uses the above information from each participant in the conference to ensure that the proposed conference does not exceed either the codec or RTP processing capabilities of the participants.

In some embodiments, the initiator terminal may send an offer message based on its concurrent codec capabilities and those of other participants for which their concurrent capabilities are known beforehand. After receiving the offer message, each participant's terminal may examine the offer message to determine N and the maximum number of codecs that are offered to determine if it can meet the constraints described in the previous sections. If the terminal can participate, it may respond with a selected codec.

In another embodiment, the other participating terminals (e.g., terminals 110B and 110C) can also include their concurrent codec capabilities in the response message. This allows the initiator terminal to store and guarantee that the terminal's capabilities are properly considered for any future conferences initiated by the same initiator terminal. In some aspects, the initiator terminal may store the capabilities in a database.

If the participating terminal determines it cannot participate it indicates this in the response message and sends its concurrent codec capabilities. The initiator terminal may then process the responses from the other participating terminals as follows: (1) if the initiator terminal receives no negative responses it allows the conference to continue; (2) if the initiator terminal receives a negative response then it uses all received concurrent codec capabilities to construct a viable offer message and transmits this in a new message (e.g., SIP Re-INVITE/UPDATE message) to some, or all, of the participants.

In some embodiments, each terminal may store a concurrent codec capabilities profile for each of terminals in its address book or a database. This profile can include the MaxEnc and MaxDec for each data type of each terminal. In other aspects, this profile can include a list of the terminals' codecs for all data types along with resource allocation factor or the percentage of processor complexity used by each instance of the codec. For example, Table 5 below illustrates an exemplary list of the terminals' codecs for all data types along with percentage of processor complexity used by each instance of the codec.

TABLE 5

| Data Type | Codec Name | Encoder Complexity | Decoder Complexity |
|---|---|---|---|
| Audio | AMR-NB | 10% | 2% |
| Audio | AMR-WB | 20% | 4% |
| Audio | EVS | 60% | 20% |

TABLE 5-continued

| Data Type | Codec Name | Encoder Complexity | Decoder Complexity |
|---|---|---|---|
| Video | H.264/AVC | 60% | 15% |
| Video | H.265/HEVC | 90% | 23% |

In some aspects, the initiator terminal can then use the above profile of each of the participants to determine an offer message that can be met by each participant using the constraint considerations described herein.

In communicating their concurrent codec capabilities, terminals can also indicate that they can handle reception of more data streams because they are able to prioritize and ignore data streams of a particular data type. For example, the terminal 110A may indicate that it can concurrently decode up to three EVS data streams (each using 20% of its processor) after which it will ignore any additional data streams received.

In some aspects, terminals can also exchange concurrent codec capabilities information before a conference is initiated to better guarantee that a viable offer message is included in the first initiation messages (e.g, the first SIP INVITE). This exchange of concurrent codec capabilities information can be performed as follows: when a user adds another user to their address book or directory on the terminal, the address book applications contact each other to exchange concurrent codec capabilities as well as any other personal information (home address, etc. . . . ) or when the codec capabilities of a terminal change (via download or swapping of terminal hardware). This exchange of information/profiles could be performed using whatever contact information identifier (ID) is provided between the users. For example: via an embedded profile multipurpose internet mail extensions (MIME) type in an email exchange if the ID is an email address; via an extensible markup language (XML) schema sent over a short message service (SMS) if the ID is the phone number; via an XML schema sent over some other messaging protocol. The profile information can be updated in a variety of ways. For example, the users make a call to each other or via the protocols described earlier for establishing conferences with in-terminal mixing, i.e., concurrent codec capabilities can be sent in the response. In another example, the terminal storing the profile may set a timer to autonomously and periodically (e.g., every month) check back with the other user's terminal to see if the capabilities have changed. These capabilities might change because of a software update or download by the user, or changing their handset. In some aspects, the terminal that has provided a profile may update all the users in its address book whenever its own capabilities have changed. Alternatively, two or more participants in a conference (who are not initiators) can exchange their concurrent codec capabilities when setting up the data session between themselves.

In some aspects, the OPTIONS request can be used to query the codec capabilities of another terminal by asking the terminal to send a copy of the session description protocol (SDP) it would offer describing its codec capabilities. This SDP will contain the concurrent codec capabilities information as described above. The OPTIONS request can be made well in-advance of a conference call and the SDP response may be stored in a profile for the queried terminal. In some embodiments, immediately before setting up a conference, the conference initiator could query the codec capabilities of all the terminals it plans to invite for which it does not have the information pre-stored.

Figure 6:
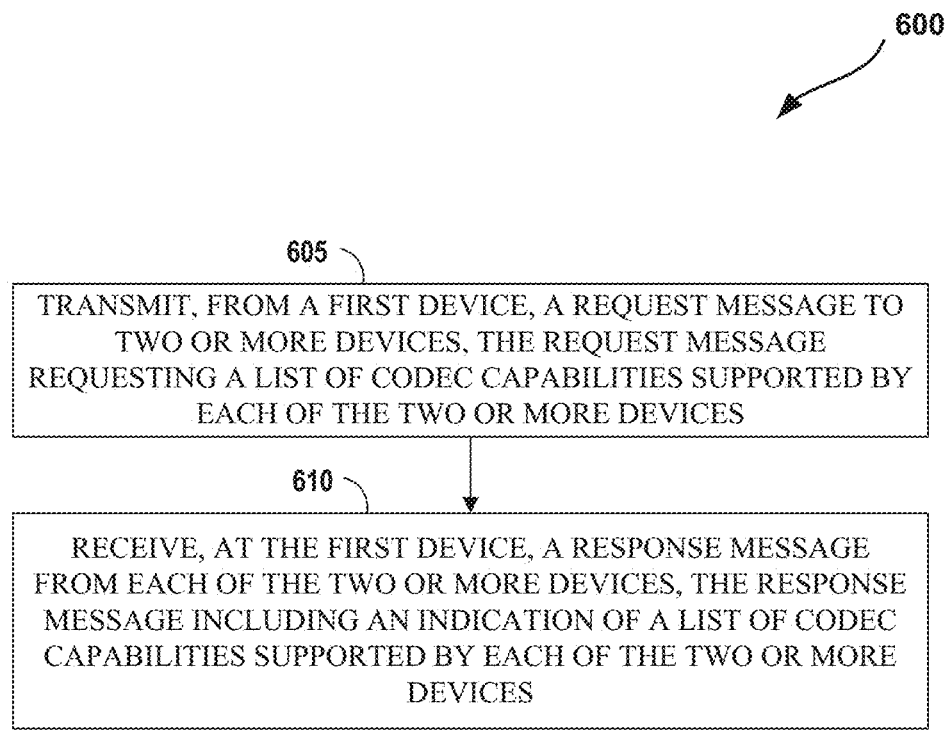
FIG. 6 is a flowchart of another exemplary method for codec negotiation in a conference.

FIG. 6 is flowchart of another exemplary method for codec negotiation in a conference. The method 600 shown in FIG. 10 may be implemented via one or more devices in the conference architecture 100, 200, 300, and/or 400. In some aspects, the method may be implemented by a device similar to the user terminals 110A-D and/or centralized processor 125 of FIGS. 1-4, or any other suitable device.

At block 605 a terminal or processor may transmit a request message to two or more devices, the request message requesting a list of codec capabilities supported by each of the two or more devices. The message may include an indication of a list of codec capabilities supported by the terminal or processor. In some aspects, the message may be based on the initiator terminal's or processor's concurrent codec capabilities. In some embodiments, the message may also be based on the codec capabilities of the other participants for which their concurrent capabilities are known beforehand.

At block 610, the terminal receives a response message from each of the two or more devices, the response message including an indication of a list of codec capabilities supported by each of the two or more devices. In some aspects, after receiving the response, the terminal or processor may process the received message to determine the indicated list of codec capabilities of a number of participants.

In some embodiments, SDP parameters may be similarly reduced in multi-stream multiparty conferencing media handling (MMCMH) session establishment using compact CCC SPD offers and answers. The ABNF definition of the compact CCC SDP parameter as described herein may apply to both compact CCCEx and CCC for MMCMH session establishment. However, while using compact CCC for CCCEx allowed for the CCC to be compressed down to a single SDP line, using compact CCC for MMCMH session initiation may be limited by the need for the SDP offer to be compliant with an SDP offer/answer model or expectation. For example, in MMCMH session establishment, the SDP offer may contain enough media lines to allow the SDP answer to select any combination of codec configurations that are supported by the terminals (e.g., the offeror terminal and the answering terminal). For example, there must be at least R media lines in the offer, where R is the maximum number streams that the offeror terminal can concurrently receive and decode.

A compact CCC SDP offer parameter for MMCMH session establishment can be performed as demonstrated herein. In some implementations, three audio codecs (AMR-NB, AMR-WB, and EVS) may be available by an offeror terminal (e.g., a terminal looking to create the MMCMH session). "A" corresponds to a maximum number of concurrent AMR-NB codecs, while "B" corresponds to a maximum number of concurrent AMR-WB codecs, and "C" corresponds to a maximum number of concurrent EVS codecs, where A>=B>=C due to their relative complexity. Accordingly, when generating an offer message, the offeror terminal may list a total of A media lines, where each of the A media lines include AMR-NP as a codec. Similarly, the offeror terminal may list a total of B media lines, where the B media lines will include AMR-WB as a codec, received simulcast with AMR-NB. Additionally, the offeror terminal may list a total of C media lines that will include EVS as a codec, received simulcast with both AMR-WB and AMR-NB. When indicating the offeror terminal's sending/encoding capabilities, one or more of the above media lines may also include all of the codecs in a simulcast sending configuration.

The above A media lines may cover all possible media configurations that could be selected in the SDP answer. To respond to the offer selecting one or more acceptable configurations, the answering terminal may communicate its answer while relying on the compact CCC SDP line which is also included in the offer.

An SDP offer that does not utilize compact CCC SDP lines, as described herein, may include the following sets of media lines to communicate substantially the same information:

"A" media lines indicating the configuration when the maximum number of decodable streams is supported. This may correspond to using the compact CCC except that there will be at least B media lines with two codecs and C media lines with three codecs in simulcast receiving configurations. Each of these additional codecs will add two more SDP lines in the media line; and A set of media lines for each configuration that can support a different number and set of concurrently decoded streams.

For example, if the offeror terminal supports a single EVS decoder, the offeror terminal reduces a maximum number of AMR-NB streams from A to $A_{1EVS}$ in the offer message. Additionally, the offer message may include a separate set of $A_{1EVS}+1$ receiving media lines listing the many AMR-NB codecs and one line that contains the EVS codec. Furthermore, when not using compact CCC SDP lines, each of the sets of media lines would require a different media configuration as specified in the MediaCapNeg framework.

An example of the different sets of configurations that may be communicated when the compact CCC SDP parameter is not used is illustrated in the following table. The table includes three configurations (A, B, and C) for N=6. However, there may be different sets of configurations for different values of N, where N is a number of participants in a conference, including the offeror terminal and all answering terminals.

TABLE 6

| Number of participants | Concurrent Codec Combinations supported at the terminal | | SDP offer examples from the terminal to the MRF for profiles A, B, and C (for illustration purposes, only audio is shown below); The terminal would send one of the SDP offers associated with the CCCEx of profile A or B or C in the examples shown below. | SDP Answer from the MRF to the terminal up on receiving, e.g. SDP offer A (N = 6) |
|---|---|---|---|---|
| N <= 6 | [Enc/send: AMR, AMR-WB, EVS]<br>[Dec/recv: 1 AMR, 1 AMR-WB, 3 EVS]<br>[Enc/send: AMR-WB, EVS]<br>[Dec/recv: 1 AMR-WB, 4 EVS]<br>[Enc/send: AMR, EVS]<br>[Dec/recv: 1 AMR, 4 EVS] | A | m=audio 49200 RTP/AVP 99 100 101<br>a=rtpmap:99 AMR/8000/1<br>a=rtpmap:100 AMR-WB/16000/1<br>a=rtpmap:101 EVS/16000/1<br>a=simulcast: send 99;100;101 recv 99,100,101<br>...<br>m=audio 49300 RTP/AVP 99 100 101<br>a=rtpmap:99 AMR/8000/1<br>a=rtpmap:100 AMR-WB/16000/1<br>a=rtpmap:101 EVS/16000/1<br>a=simulcast: recv 99,100,101<br>...<br>m=audio 49400 RTP/AVP 99 100 101<br>a=rtpmap:99 AMR/8000/1<br>a=rtpmap:100 AMR-WB/16000/1<br>a=rtpmap:101 EVS/16000/1<br>a=simulcast: recv 99,100,101<br>...<br>m=audio 49500 RTP/AVP 99 100<br>a=rtpmap:99 AMR/8000/1<br>a=rtpmap:100 AMR-WB/16000/1<br>a=simulcast: recv 99,100<br>...<br>m=audio 49600 RTP/AVP 99<br>a=rtpmap:99 AMR/8000/1<br>a=recv 99<br>... | m=audio 49200 RTP/AVP 99 100 101<br>a=rtpmap:99 AMR/8000/1<br>a=rtpmap:100 AMR-WB/16000/1<br>a=rtpmap:101 EVS/16000/1<br>a=simulcast: recv 99;100;101 send 99,100,101<br>...<br>m=audio 49300 RTP/AVP 99 100 101<br>a=rtpmap:99 AMR/8000/1<br>a=rtpmap:100 AMR-WB/16000/1<br>a=rtpmap:101 EVS/16000/1<br>a=simulcast: send 99,100,101<br>...<br>m=audio 49400 RTP/AVP 99 100<br>a=rtpmap:99 AMR/8000/1<br>a=rtpmap:100 AMR-WB/16000/1<br>a=simulcast: send 99,100<br>...<br>m=audio 49500 RTP/AVP 99<br>a=rtpmap:99 AMR/8000/1<br>a=send 99<br>...<br>m=audio 49600 RTP/AVP 99<br>a=rtpmap:99 AMR/8000/1<br>a=send 99<br>... |
| | | B | m=audio 49200 RTP/AVP 100 101<br>a=rtpmap:100 AMR-WB/16000/1<br>a=rtpmap:101 EVS/16000/1<br>a=simulcast: send 100;101 recv 100,101<br>...<br>m=audio 49300 RTP/AVP 100 101<br>a=rtpmap:100 AMR-WB/16000/1<br>a=rtpmap:101 EVS/16000/1<br>a=simulcast: recv 100,101<br>...<br>m=audio 49400 RTP/AVP 100 101<br>a=rtpmap:100 AMR-WB/16000/1 | Similar selections to those shown above may be made for B. |

TABLE 6-continued

| Number of participants | Concurrent Codec Combinations supported at the terminal | | SDP offer examples from the terminal to the MRF for profiles A, B, and C (for illustration purposes, only audio is shown below); The terminal would send one of the SDP offers associated with the CCCEx of profile A or B or C in the examples shown below. | SDP Answer from the MRF to the terminal up on receiving, e.g. SDP offer A (N = 6) |
|---|---|---|---|---|
| | | | a=rtpmap:101 EVS/16000/1<br>a=simulcast: recv 100,101<br>...<br>m=audio 49500 RTP/AVP 100 101<br>a=rtpmap:100 AMR-WB/16000/1<br>a=rtpmap:101 EVS/16000/1<br>a=simulcast: recv 100,101<br>...<br>m=audio 49600 RTP/AVP 100<br>a=rtpmap:100 AMR-WB/16000/1<br>a=recv 100<br>... | |
| | | C | m=audio 49200 RTP/AVP 99 101<br>a=rtpmap:99 AMR/8000/1<br>a=rtpmap:101 EVS/16000/1<br>a=simulcast send 99;101 recv 99,101<br>...<br>m=audio 49300 RTP/AVP 99 101<br>a=rtpmap:99 AMR/8000/1<br>a=rtpmap:101 EVS/16000/1<br>a=simulcast recv 99,101<br>...<br>m=audio 49400 RTP/AVP 99 101<br>a=rtpmap:99 AMR/8000/1<br>a=rtpmap:101 EVS/16000/1<br>a=simulcast recv 99,101<br>...<br>m=audio 49500 RTP/AVP 99 101<br>a=rtpmap:99 AMR/8000/1<br>a=rtpmap:101 EVS/16000/1<br>a=simulcast recv 99,101<br>...<br>m=audio 49700 RTP/AVP 99<br>a=rtpmap:99 AMR/8000/1<br>a=recv 99<br>... | Similar selections to those shown above may be made for C. |

However, by implementing compact CCC SDP parameters with the offer and answer messages, listing any configurations aside from the A media lines may be avoided, and, thus, use of the MediaCapNeg framework may be avoided. An amount of SDP lines saved by implementing compact CCC SDP parameters with the MMCMH session establishment may depend on a relative complexity between each of the codecs. The more variation in the relative complexities, the more sets of media lines that would be needed in non-compact CCC SDP parameter offers because substituting one codec instance for another codec instance may have a greater effect on the number of concurrent decoders.

For example, assume that codec C is twice as complex as codec B, which is twice as complex as codec A, and where codec A represents a maximum number of instances of the simplest codec that can be run. When using the compact CCC SDP parameter for offer messages, there would only be one set of A media lines in the SDP offer message that would contain the following number of SDP lines:

7 lines for common SDP aspects
2 lines for each of the A media lines including codec A
2 lines for each of the B media lines including codec B
2 lines for each of the C media lines including codec C
1 line for the compact CCC SDP parameters Accordingly, there would be a total of 8+2A+2B+2C=8+ 2A+A+0.5A=8+3.5A SDP lines for the SDP offer message.

However, when not using the compact CCC SDP parameter for offer messages, there may be the following sets of media lines:

| Set of Media Lines | # of Codecs | # of SDP lines | Total # of SDP lines |
|---|---|---|---|
| 1 | Codec A: A<br>Codec B: 0<br>Codec C: 0 | 7 lines for common SDP aspects<br>2 lines for each of the A media lines with codec A | 2A + 7 |
| 2 | Codec A: A-2<br>Codec B: 1<br>Codec C: 0 | 7 lines for common SDP aspects<br>2 lines for each of the (A-4) media lines including codec A<br>2 lines for two media lines including codec B | 2A + 5 |
| 3A | Codec A: A-4<br>Codec B: 2<br>Codec C: 0 | 7 lines for common SDP aspects<br>2 lines for each of the (A-4) media lines including codec A<br>2 lines for two media lines including codec B | 2A + 3 |
| 3B | Codec A: A-4<br>Codec B: 0<br>Codec C: 1 | 7 lines for common SDP aspects<br>2 lines for each of the (A-4) media lines including codec A<br>2 lines for two media lines including codec B | 2A + 1 |

-continued

| Set of Media Lines | # of Codecs | # of SDP lines | Total # of SDP lines |
|---|---|---|---|
| 4A | Codec A: A-6<br>Codec B: 3<br>Codec C: 0 | 7 lines for common SDP aspects<br>2 lines for each of the (A-6) media lines including codec A<br>2 lines for three media lines including codec B | 2A + 1 |
| 4B | Codec A: A-6<br>Codec B: 1<br>Codec C: 1 | 7 lines for common SDP aspects<br>2 lines for each of the (A-6) media lines including codec A<br>2 lines for one media line including codec B<br>2 lines for one media line including codec C | 2A − 1 |
| Etc . . . | | | |

Extending the above pattern it can be seen that the total number of SDP lines needed to indicate all the possible configurations is A (1+2+3+ . . . A/4)×(2A+$m_i$) when not using the compact CCC SDP parameter, where $m_i$ is a constant for a particular set of media lines that is independent of A. At a minimum, a lower bound on the above is that the number of media lines at least 0.25 $A^4$+$A^3$.

Therefore the gains of using the compact CCC SDP format in the SDP offer reduces the number of SDP lines in the SDP offer by approximately a factor of (0.25 $A^4$+$A^3$)/(3.5A+8)~=0.0714$A^3$+0.286$A^2$.

Accordingly, for A=4 there is a compression gain factor of 5.81; for A=8, there is a compression gain factor of 42.67; for A=16 there is a compression gain factor of 320. This demonstrates that the compression gains in reducing the size of the SDP offer can be substantial, especially for offeror terminals that have the capability to support a large number of concurrent codecs of different computational complexities.

In some embodiments, the use of the compact CCC SDP parameter to compress the number of media lines in the SDP offer as described herein may require that the answerer terminal be configured to understand the compact CCC SDP parameter so that the answerer terminal knows that not all of the media configurations described in the compact CCC SDP offer are supported. If the answerer terminal does not understand the compact CCC SDP parameter, it may improperly select a set of concurrent codecs that are not supported by the offeror terminal.

Accordingly, whenever an offeror uses the compact CCC SDP parameter along with the single media configuration of A media lines, the offeror terminal may know that the answerer terminal can properly understand the compact CCC SDP parameter. For example, the offeror terminal may have previously queried the answerer terminal's CCC using any method (e.g., an OPTIONs method) and received a response including the compact CCC SDP parameter, which the offeror terminal uses as a basis to record that the answerer terminal understands the compact CCC format and can use this format when initiating a MMCMH session. Alternatively, the offeror terminal may prevent the answerer terminal that does not understand the compact CCC format from selecting an unsupported configuration. For example, the offeror terminal can accomplish this by defining a new tag for CCC which is populated in the Require header of the SIP INVITE along with the compact CCC SDP parameter in the body. If the answerer terminal understands the CCC tag, then it will respond to the INVITE accordingly. If the answerer terminal does not understand the CCC tag, it will reject the INVITE and the offeror terminal will have to send a re-INVITE without the CCC and a more verbose offer with all the associated media line configurations.

In some embodiments, the compact CCC SDP offer parameter may be transmitted by an offeror terminal to one or more answerer terminals. The compact CCC SDP offer parameter may include one or more CCC supported by the offeror terminal. The offeror terminal may then receive a response from at least one of the one or more answerer terminals. The response may include a selection of one of the CCC supported by the offeror terminal that is also supported by the at least one answerer terminal. Based on that response, the offeror terminal may transmit a data stream to the at least one answerer terminal.

Figure 7:
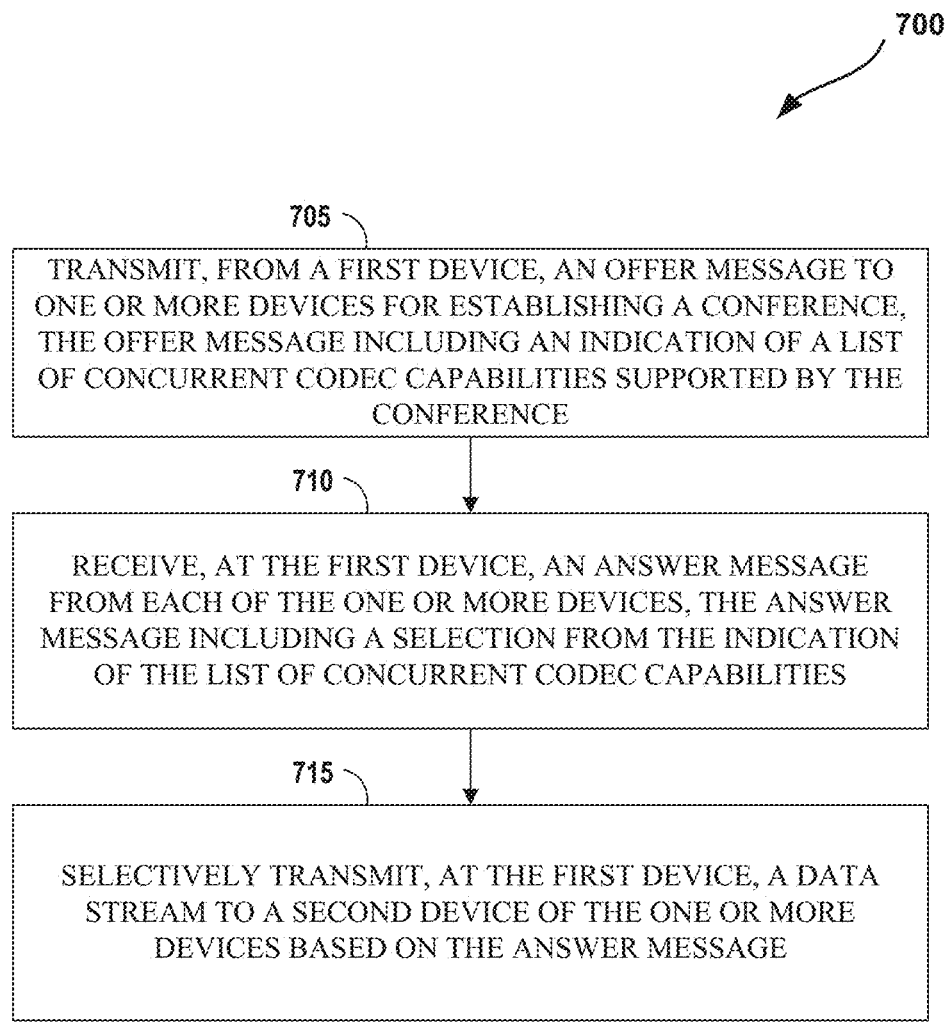
FIG. 7 is a flowchart of an exemplary method for using compact concurrent codecs for initiating conference sessions.

FIG. 7 is flowchart of an exemplary method 700 for using compact concurrent codecs for initiating conference sessions. The method 700 shown in FIG. 7 may be implemented via one or more devices in the conference architecture 100, 200, 300, and/or 400. In some aspects, the method 700 may be implemented by a device similar to the user terminals 110A-D and/or centralized processor 125 of FIGS. 1-4, or any other suitable device.

At block 705 a terminal or processor may transmit an offer message to one or more devices for establishing a conference. The offer message may include an indication of a list of concurrent codec capabilities supported by the conference. In some aspects, the message may be based on the initiator terminal's or processor's concurrent codec capabilities. In some embodiments, the message may also be based on the codec capabilities of the other participants for which their concurrent capabilities are known beforehand.

At block 710, the terminal receives an answer message from the one or more devices. The answer message may include a selection from the indication of the list of concurrent codec capabilities.

At block 715, the terminal selectively transmits a data stream to the one or more devices based on the answer message.

Figure 8:
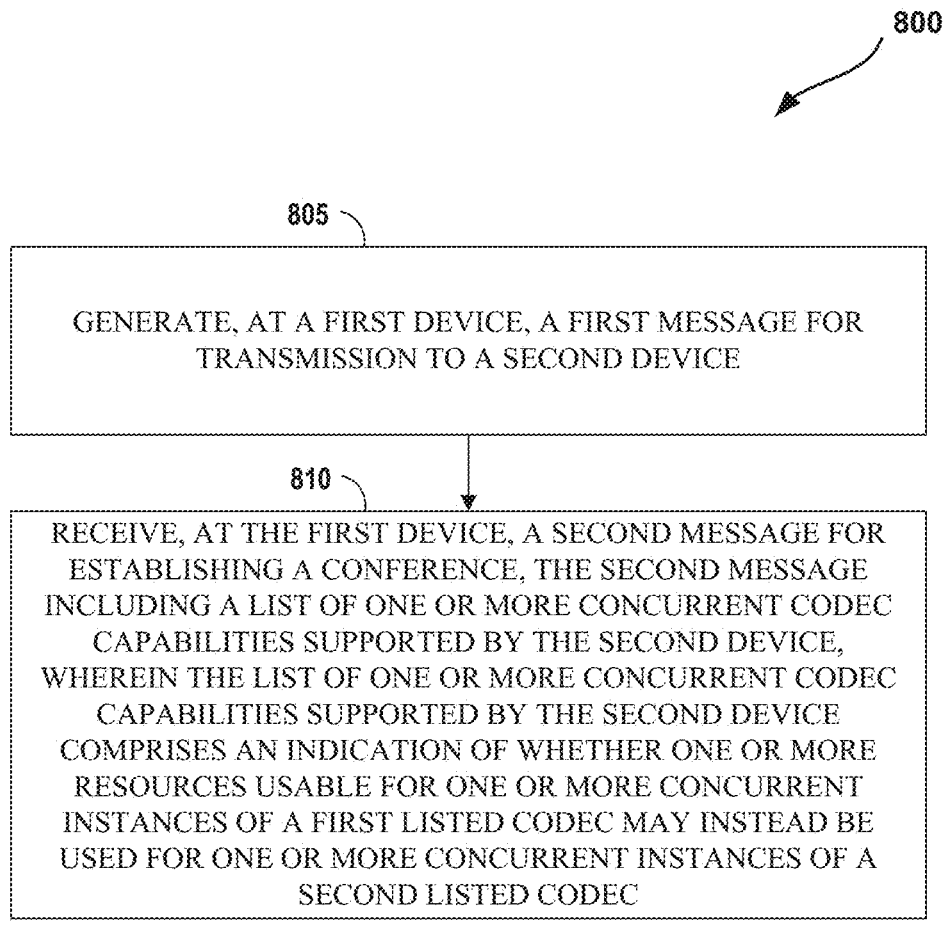
FIG. 8 is another flowchart of an exemplary method for using compact concurrent codecs for initiating conference sessions.

FIG. 8 is another flowchart of an exemplary method 800 for using compact concurrent codecs for initiating conference sessions. The method 800 shown in FIG. 8 may be implemented via one or more devices in the conference architecture 100, 200, 300, and/or 400. In some aspects, the method 800 may be implemented by a device similar to the user terminals 110A-D and/or centralized processor 125 of FIGS. 1-4, or any other suitable device.

At block 805 a terminal or processor of a first device may generate a first message for transmission to a second device. The first message may include an offer message or a request message. The first message may include an indication of a list of concurrent codec capabilities supported by the terminal or processor or request an indication of a list of concurrent codec capabilities supported by the second device. In some embodiments, the first message may be generated by a means for generating the first message for transmission to a second device. In some embodiments, the means for generating the first message may comprise one or more devices in the conference architecture 100, 200, 300, and/or 400. In some aspects, the means for generating the first message may be implemented by a device similar to the user terminals 110A-D and/or centralized processor 125 of FIGS. 1-4, or any other suitable device.

At block 810, the terminal receives a second message for establishing a conference between the terminal and the second device. The second message may include a list of one or more concurrent codec capabilities supported by the second device. The list of one or more concurrent codec capabilities supported by the second device may comprise an indication of whether one or more resources usable for one or more concurrent instances of a first listed codec may instead be used for one or more concurrent instances of a second listed codec. In some embodiments, the second message may be received by a means for receiving the second message for establishing a conference between the terminal and the second device. In some embodiments, the means for receiving the second message may comprise one or more devices in the conference architecture 100, 200, 300, and/or 400. In some aspects, the means for generating the first message may be implemented by a device similar to the user terminals 110A-D and/or centralized processor 125 of FIGS. 1-4, or any other suitable device.

In some embodiments, the second message may comprise a response message transmitted by the second device in response to an offer message. In some embodiments, the second message may comprise an answer message.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for transmitting an offer message to two or more devices may comprise a transmitter or an antenna of the terminals 110A-D. Additionally, means for receiving a response message may comprise a receiver or an antenna of the terminals 110A-D. Additionally, means for determining whether the two or more devices may continue to participate in the conference may comprise a processor of the user terminals 110A-D. Further, means for receiving an offer message from a device may comprise a receiver or an antenna of the terminals 110A-D. Also, means for transmitting a response message may comprise a transmitter or an antenna of the terminals 110A-D.

Information and signals may be represented using any of a variety of different technologies and techniques. For example, data, instructions, commands, information, signals, bits, symbols, and chips that may be referenced throughout the above description may be represented by voltages, currents, magnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for communicating between multiple parties, the method comprising:
   generating, at a first device, for transmission to a second device, a request message configured to query capabilities of the second device; and
   receiving, at the first device, a second message in response to the request message, the second message including a list of one or more concurrent codec capabilities supported by the second device, wherein the list of one or more concurrent codec capabilities supported by the second device comprises an indication of whether or not one or more concurrent instances of a first listed codec for coding a media stream for transmission to the second device are replaceable by one or more concurrent instances of a second listed codec for coding the media stream for transmission to the second device.

2. The method of claim 1, wherein the indication indicates that the one or more concurrent instances of the first listed codec can be replaced by the one or more concurrent instances of the second listed codec.

3. The method of claim 2, wherein the indication comprises a "," separating the first and second listed codecs.

4. The method of claim 1, wherein the indication indicates that the one or more concurrent instances of the first listed codec cannot be replaced by the one or more concurrent instances of the second listed codec.

5. The method of claim 4, wherein the indication comprises a ";" separating the first and second listed codecs.

6. The method of claim 1, wherein the first and second listed codecs are presented in a session description protocol (SDP) format.

7. The method of claim 1, wherein the one or more concurrent codec capabilities in the list are ordered by computational complexity.

8. The method of claim 7, wherein the second listed codec is less computationally complex than the first listed codec and wherein the second listed codec is listed after the first listed codec in a SDP format.

9. The method of claim 1, wherein the list of one or more concurrent codec capabilities supported by the second device includes a level specifying a level of a listed codec.

10. The method of claim 1, wherein the list of one or more concurrent codec capabilities supported by the second device includes a profile indicator indicating one or more tool sets available for a listed codec.

11. The method of claim 1, further comprising:
transmitting, from the first device, the request message to the second device prior to a conference call with the second device; and
storing, at the first device, the list of one or more concurrent codec capabilities supported by the second device.

12. An apparatus for initiating a multi-party, multi-stream conference that employs a plurality of codecs, the apparatus comprising:
a processor configured to generate a request message for transmission to a first device, wherein the request message is configured to query capabilities of the first device; and
a receiver configured to receive a second message from the first device in response to the request message, the second message including a list of one or more concurrent codec capabilities supported by the first device, wherein the list of one or more concurrent codec capabilities supported by the first device comprises an indication of whether or not one or more concurrent instances of a first listed codec for coding a media stream for transmission to the first device are replaceable by one or more concurrent instances of a second listed codec for coding the media stream for transmission to the first device.

13. The apparatus of claim 12, wherein the indication indicates that the one or more concurrent instances of the first listed codec can be replaced by the one or more concurrent instances of the second listed codec.

14. The apparatus of claim 13, wherein the indication comprises a "," separating the first and second listed codecs.

15. The apparatus of claim 12, wherein the indication indicates that the one or more concurrent instances of the first listed codec cannot be replaced by the one or more concurrent instances of the second listed codec.

16. The apparatus of claim 15, wherein the indication comprises a ";" separating the first and second listed codecs.

17. The apparatus of claim 12, wherein the first and second listed codecs are presented in a session description protocol (SDP) format.

18. The apparatus of claim 12, wherein the one or more concurrent codec capabilities in the list are ordered by computational complexity.

19. The apparatus of claim 18, wherein the second listed codec is less computationally complex than the first listed codec and wherein the second listed codec is listed after the first listed codec in a SDP format.

20. The apparatus of claim 12, wherein the list of one or more concurrent codec capabilities supported by the first device includes a level specifying a level of a listed codec.

21. The apparatus of claim 12, wherein the list of one or more concurrent codec capabilities supported by the first device includes a profile indicator indicating one or more tool sets available for a listed codec.

22. The apparatus of claim 12, further comprising a transmitter configured to:
transmit the request message to the first device prior to the conference; and
storing, at the apparatus, the list of one or more concurrent codec capabilities supported by the first device.

23. An apparatus for initiating a multi-party, multi-stream conference that employs a plurality of codecs, the apparatus comprising:
means for generating a request message for transmission to a first device, the request message configured to query capabilities of the first device; and
means for receiving a second message from the first device in response to the request message, the second message including a list of one or more concurrent codec capabilities supported by the first device, wherein the list of one or more concurrent codec capabilities supported by the first device comprises an indication of whether or not one or more concurrent instances of a first listed codec for coding a media stream for transmission to the first device are replaceable by one or more concurrent instances of a second listed codec for coding the media stream for tranmission to the first device.

24. The apparatus of claim 23, wherein the indication indicates that the one or more concurrent instances of the first listed codec can be replaced by the one or more concurrent instances of the second listed codec.

25. The apparatus of claim 24, wherein the indication comprises a "," separating the first and second listed codecs.

26. The apparatus of claim 23, wherein the indication indicates that the one or more concurrent instances of the first listed codec cannot be replaced by the one or more concurrent instances of the second listed codec.

27. The apparatus of claim 26, wherein the indication comprises a ";" separating the first and second listed codecs.

28. The apparatus of claim 23, wherein the first and second listed codecs are presented in a session description protocol (SDP) format.

29. The apparatus of claim 23, wherein the one or more concurrent codec capabilities in the list are ordered by computational complexity.

30. The apparatus of claim 29, wherein the second listed codec is less computationally complex than the first listed codec and wherein the second listed codec is listed after the first listed codec in a SDP format.

31. The apparatus of claim 23, wherein the list of one or more concurrent codec capabilities supported by the first device includes a level corresponding to a complexity of a media stream that a listed codec supports.

32. The apparatus of claim 23, wherein the list of one or more concurrent codec capabilities supported by the first device includes a profile indicator indicating one or more tool sets available for a listed codec.

33. The apparatus of claim 23, further comprising a transmitter configured to:
   transmit the request message to the first device prior to the conference; and
   storing, at the apparatus, the list of one or more concurrent codec capabilities supported by the first device.

34. A non-transitory computer readable medium comprising instructions that, when executed, cause a processor to perform a method of:
   generating, at a first device, a request message for transmission to a second device, the request message configured to query capabilities of the second device; and
   receiving, at the first device, a second message in response to the request message, the second message including a list of one or more concurrent codec capabilities supported by the second device, wherein the list of one or more concurrent codec capabilities supported by the second device comprises an indication of whether or not one or more concurrent instances of a first listed codec for coding a media stream for transmission to the second device are replaceable by one or more concurrent instances of a second listed codec for coding the media stream for transmission to the second device.

35. The non-transitory computer readable medium of claim 34, wherein the indication indicates that the one or more concurrent instances of the first listed codec can be replaced by the one or more concurrent instances of the second listed codec.

36. The non-transitory computer readable medium of claim 35, wherein the indication comprises a "," separating the first and second listed codecs.

37. The non-transitory computer readable medium of claim 34, wherein the indication indicates that the one or more concurrent instances of the first listed codec cannot be replaced by the one or more concurrent instances of the second listed codec.

38. The non-transitory computer readable medium of claim 37, wherein the indication comprises a ";" separating the first and second listed codecs.

39. The non-transitory computer readable medium of claim 34, wherein the first and second listed codecs are presented in a session description protocol (SDP) format.

40. The non-transitory computer readable medium of claim 34, wherein the one or more concurrent codec capabilities in the list are ordered by computational complexity.

41. The non-transitory computer readable medium of claim 40, wherein the second listed codec is less computationally complex than the first listed codec and wherein the second listed codec is listed after the first listed codec in a SDP format.

42. The non-transitory computer readable medium of claim 34, wherein the list of one or more concurrent codec capabilities supported by the second device includes a level corresponding to a complexity of a media stream that a listed codec supports.

43. The non-transitory computer readable medium of claim 34, wherein the list of one or more concurrent codec capabilities supported by the second device includes a profile indicator indicating one or more tool sets available for a listed codec.

44. The non-transitory computer readable medium of claim 34, further comprising:
   transmitting, from the first device, the request message to the second device prior to a conference call with the second device; and
   storing, at the first device, the list of one or more concurrent codec capabilities supported by the second device.

45. The method of claim 11, further comprising:
   determining whether concurrent capability information associated with the second device is stored at the first device; and
   based on a determination that concurrent capability information is not stored at the first device, transmitting the request message to the second device.

46. The method of claim 1, further comprising:
   determining, by the first device, a plurality of devices to invite to a conference call, the plurality of devices including at least the second device and a third device;
   transmitting the request message to the second device; and
   transmitting a second request message to the third device, the second request message being configured to query capabilities of the third device.

47. The apparatus of claim 22, wherein the processor is further configured to:
   determine whether concurrent capability information associated with the first device is stored at the apparatus; and
   based on a determination that concurrent capability information is not stored at the apparatus, transmit, using the transmitter, the request message to the first device.

48. The apparatus of claim 12, wherein the processor is further configured to:
   determine a plurality of devices to invite to a conference call, the plurality of devices including the first device and a second device;
   transmit the request message to the first device; and
   transmit a second request message to the second device, the second request message configured to query capabilities of the second device.

49. The apparatus of claim 33, further comprising:
   means for determining whether concurrent codec capability information associated with the first device is stored at the apparatus; and
   means for, based on a determination that concurrent codec capability information associated with the first device is not stored at the apparatus, transmitting the request message to the first device.

50. The apparatus of claim 23, further comprising:
   means fir determining a plurality of devices to invite to a conference call, the plurality of devices including the first device and a second device;
   means for transmitting the request message to the first device; and
   means for transmitting a second request message to the second device, the second request message configured to query capabilities of the second device.

51. The non-transitory computer readable medium of claim 44, wherein execution of the instructions causes the processor to perform operations further comprising:
   determining whether concurrent codec information associated with the second device is stored at the first device; and
   based on a determination that concurrent codec capability information associated with the second device is not stored at the first device, transmitting the request message to the second device.

52. The non-transitory computer readable medium of claim 34, wherein execution of the instructions causes the processor to perform operations further comprising:
- determining, by the first device, a plurality of devices to invite to a conference call, the plurality of devices including the second device and a third device;
- transmitting the request message to the second device; and
- transmitting a second request message to the third device, the second request message being configured to query capabilities of the third device.

\* \* \* \* \*